United States Patent
Suzuki et al.

(10) Patent No.: US 9,533,437 B2
(45) Date of Patent: Jan. 3, 2017

(54) METHOD FOR PRODUCING SHAPED PRODUCT WITH OPENING, AND SHAPED PRODUCT

(71) Applicant: Teijin Limited, Osaka-shi, Osaka (JP)

(72) Inventors: Shuhei Suzuki, Osaka (JP); Hodaka Yokomizo, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 14/906,637

(22) PCT Filed: Jun. 16, 2015

(86) PCT No.: PCT/JP2015/067259
§ 371 (c)(1),
(2) Date: Jan. 21, 2016

(87) PCT Pub. No.: WO2015/194533
PCT Pub. Date: Dec. 23, 2015

(65) Prior Publication Data
US 2016/0158975 A1    Jun. 9, 2016

(30) Foreign Application Priority Data

Jun. 20, 2014  (JP) .................................. 2014-127295

(51) Int. Cl.
*B29C 43/02* (2006.01)
*B29C 43/18* (2006.01)
(Continued)

(52) U.S. Cl.
CPC ............... *B29C 43/02* (2013.01); *B29C 43/18* (2013.01); *B29C 43/58* (2013.01); *B29K 2101/12* (2013.01);
(Continued)

(58) Field of Classification Search
CPC ... B29C 43/02; B29C 43/58; B29C 2043/5825
See application file for complete search history.

(56) References Cited

U.S. PATENT DOCUMENTS

2014/0077412 A1* 3/2014 Taniguchi ............... F25B 49/02
264/257
2014/0148072 A1* 5/2014 Nagakura ............. B29C 43/003
442/60
(Continued)

FOREIGN PATENT DOCUMENTS

JP          H06-335934 A       12/1994
JP          2009-196145 A      9/2009
(Continued)

OTHER PUBLICATIONS

Sep. 29, 2015—International Search Report—Intl App PCT/JP2015/067259.
(Continued)

*Primary Examiner* — James Sanders
(74) *Attorney, Agent, or Firm* — Banner & Witcoff, Ltd.

(57) ABSTRACT

A method for producing a shaped product having an opening by arranging a molding material including discontinuous carbon fibers and a thermoplastic resin on a mold and cold-pressing the molding material, wherein
(1) the mold has a portion serving as a closable cavity and
(2) the molding material to be arranged on the mold has a projected area larger than the projected area of the mold cavity, and wherein
in the cold pressing, the molding material flows to form an end part of the shaped product, the distance over which the molding material flows being longer than 0 mm but not longer than 150 mm.

8 Claims, 18 Drawing Sheets

(51) Int. Cl.
*B29C 43/58* (2006.01)
*B29K 101/12* (2006.01)
*B29K 105/12* (2006.01)
*B29K 105/00* (2006.01)
*B29K 307/04* (2006.01)
*B29L 31/30* (2006.01)

(52) U.S. Cl.
CPC ...... *B29K 2105/12* (2013.01); *B29K 2105/256* (2013.01); *B29K 2307/04* (2013.01); *B29L 2031/30* (2013.01)

(56) References Cited

U.S. PATENT DOCUMENTS

2014/0178631 A1* 6/2014 Taniguchi ................. C08J 5/04
                                                        428/130
2014/0262088 A1* 9/2014 Deka ..................... D21H 13/24
                                                        162/146

FOREIGN PATENT DOCUMENTS

| JP | 2011-218798 A | 11/2011 |
| JP | 2012-250430 A | 12/2012 |
| WO | 2013-031860 A1 | 3/2013 |

OTHER PUBLICATIONS

Sep. 29, 2015—(WO) Written Opinion of ISA—Intl App PCT/JP2015/067259.

\* cited by examiner

FIG. 1A
FIG. 1B
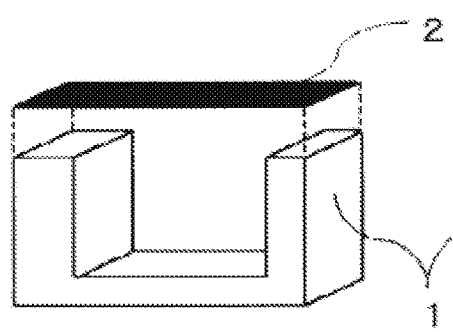
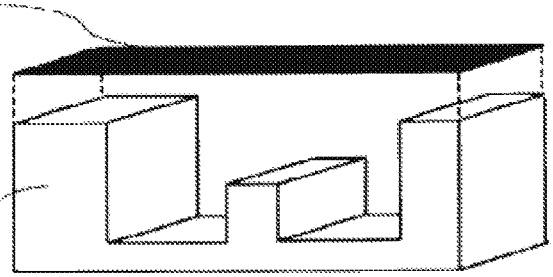
FIG. 2A
FIG. 2B
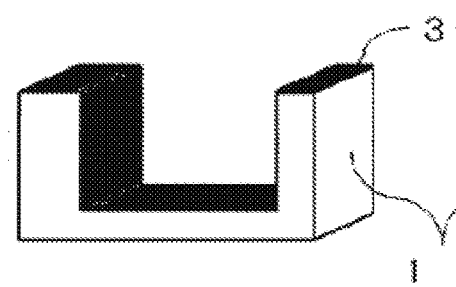
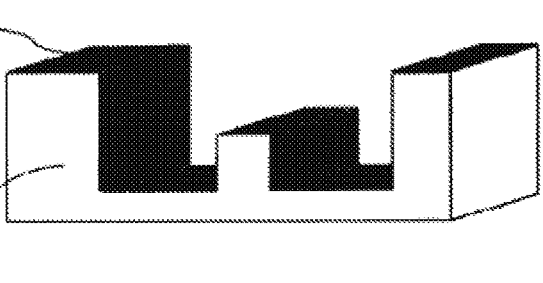
FIG. 3A
FIG. 3B
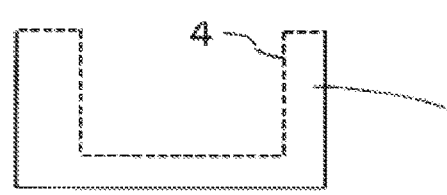
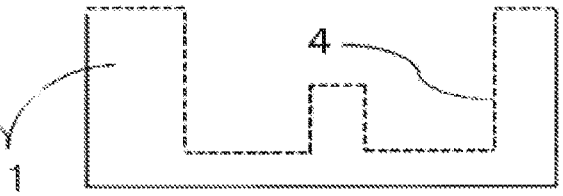

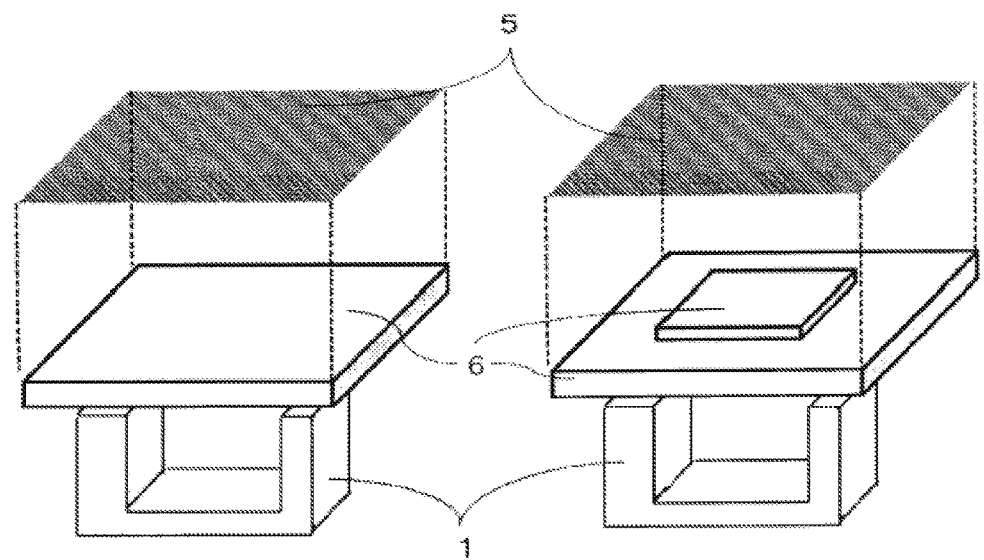

FIG. 18A
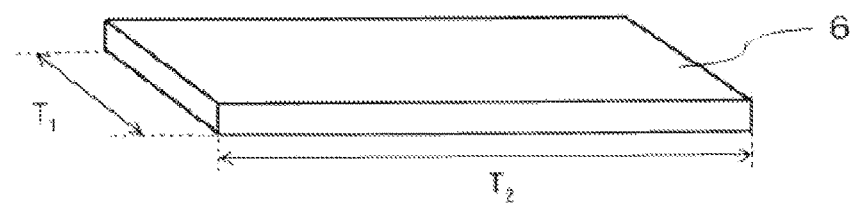
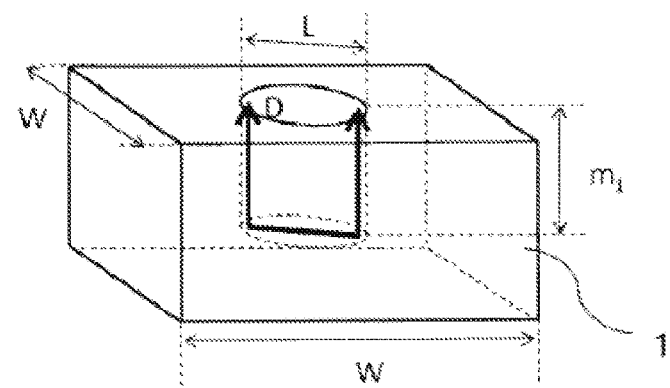
FIG. 18B
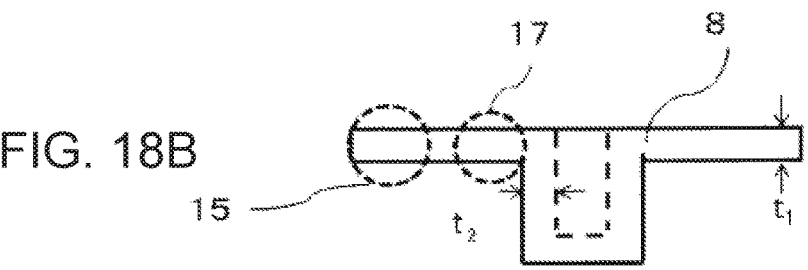

FIG. 19A
FIG. 19B
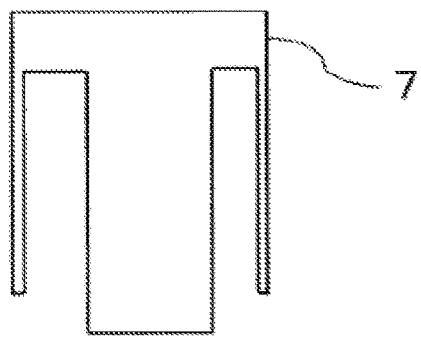
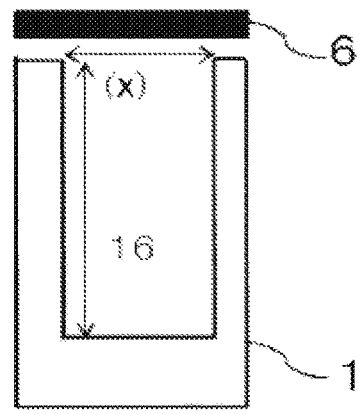
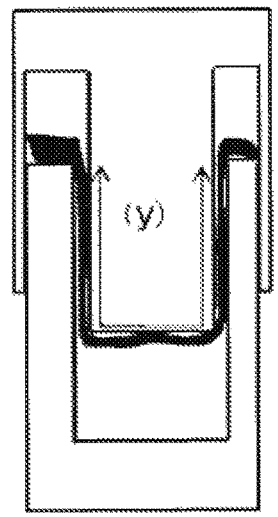

METHOD FOR PRODUCING SHAPED PRODUCT WITH OPENING, AND SHAPED PRODUCT

CROSS REFERENCE TO RELATED APPLICATIONS

This is a U.S. National Phase Application under 35 U.S.C. §371 of International Application No. PCT/JP2015/067259, filed Jun. 16, 2015, which claims priority to Japanese Application 2014-127295 filed Jun. 20, 2014 and which was published Under PCT Article 21(2), the entire contents of which are incorporated herein by reference.

TECHNICAL FIELD

The present invention relates to a method for producing a shaped product by heating a molding material including discontinuous carbon fibers and a thermoplastic resin to a temperature not lower than the softening temperature of the thermoplastic resin, subsequently introducing the molding material into a mold, and clamping the mold to press and shape the molding material. The invention further relates to a shaped product obtained by the production method.

BACKGROUND ART

Molding materials reinforced with carbon fibers have been extensively utilized not only as structural materials for airplanes, motor vehicles, and the like but also in general industrial applications, sports applications, or the like, such as tennis rackets, golf club shafts, and fishing rods, so as to take advantage of the high specific strength and specific modulus thereof. Examples of the forms of carbon fibers for use in such applications include woven fabric produced from continuous fibers, UD sheet in which fibers are parallel arranged unidirectionally, random sheet produced from cut fibers, and nonwoven fabric.

In recent years, composites employing thermoplastic resins in place of the conventional thermosetting resins as the matrix are attracting attention. For example, a molding method has been developed in which a molding base composed of a mat made of discontinuous long fibers, and a thermoplastic resin impregnated thereinto is heated to a temperature not lower than the melting point of the thermoplastic resin and introduced into a mold regulated so as to have a temperature not higher than the melting point or glass transition temperature, and the mold is then clamped to thereby perform formation.

In the method of forming a fiber-reinforced molding material described in patent document 1, for example, a fiber-reinforced molding material having a size not smaller than the projected area of the mold is placed and the excessive portions are removed by the shear force applied during mold clamping, in order to simplify the steps for shaped-product production and improve the operation efficiency. Patent document 2 describes a molding method in which two sheets of molding material are press-molded to thereby obtain a shaped product in which the minimum thickness of a flange part is smaller than the thickness of the wall surface of the opening.

Meanwhile, patent document 3 employs a configuration in which a random mat used in a charge ratio that is small relative to the shape of the mold is press-molded to thereby avoid the occurrence of excessive portions.

Patent document 4 describes a technique in which a flange part is press-molded first and the remaining part is press-molded next.

CITATION LIST

Patent Documents

[Patent Document 1] JP-A-2011-218798
[Patent Document 2] JP-A-2009-196145
[Patent Document 3] JP-A-2012-250430
[Patent Document 4] JP-A-6-335934

SUMMARY OF THE INVENTION

Problems that the Invention is to Solve

However, in the method described in patent document 1, a molding material is placed over an area which is large as compared with the projected area of the mold and the excessive portions are removed with the shear edges of the mold. In this method, however, it is necessary to secure and maintain the durability of the mold shear edges, and the production steps frequently encounter troubles. Furthermore, a material loss and a time loss arise due to the resultant excessive portions, and the method as a whole necessitates an enormous cost.

In the molding method described in patent document 2, wrinkle-hold-down is necessary for further improving surface properties, resulting in the necessity of additional equipment. In addition, the portions in which wrinkles have been held down must be cut off later, resulting in a material loss and a time loss.

Meanwhile, in the method described in patent document 3, a molding material having a size up to 100% of the projected area of the mold is placed, and the molding material is caused to flow after mold clamping, thereby producing a shaped product. This method is free from the necessity of removing excessive portions. However, there undesirably are cases where the shaped product includes portions which differ in fiber orientation or strength or, because of the flow of the molding material, the peripheral portion of the shaped product obtained is apt to be insufficient in the stability of mechanical properties as compared with the shaped-product central portion, which has not flowed.

Furthermore, the method described in patent document 4 is disadvantageous in that not only the shaped product includes portions which differ in density but also the pressing step is complicated, resulting in poor production efficiency. In addition, in the case of using carbon fibers as the reinforcing fibers, the carbon fibers are less apt to flow as compared with glass fibers and this molding material is apt to cool. Because of this, this carbon-fiber-containing molding material which has been merely placed on a mold cannot be press-molded in the same manner as for the case of using glass fibers.

Consequently, the present invention relates to a method for producing a shaped product by arranging a molding material including discontinuous carbon fibers and a thermoplastic resin on a mold and cold-pressing the molding material. An object of the invention is to eliminate those problems of conventional-art techniques and to provide a method for shaped-product production which, in particular, gives a shaped product that has even in fiber orientation and strength and a method for producing a shaped product which is excellent in terms of step simplicity and operation efficiency during shaped-product production.

Means for Solving the Problems

The present inventors diligently made investigations and, as a result, have discovered that those problems can be solved by the means shown below. The present invention has been thus achieved.

<1> A method for producing a shaped product having an opening by arranging a molding material comprising discontinuous carbon fibers and a thermoplastic resin on a mold and cold-pressing the molding material, wherein (1) the mold has a portion serving as a closable cavity and (2) the molding material to be arranged on the mold has a projected area larger than the projected area of the mold cavity, and in the cold pressing, the molding material flows to form an end part of the shaped product, the distance over which the molding material flows being longer than 0 mm and not longer than 150 mm.

<2> The method for producing a shaped product according to <1>, wherein the flow occurs in in-plane directions of the molding material.

<3> The method for producing a shaped product according to <1> or <2>, wherein the projected area of the molding material to be arranged on the mold is up to 3 times the overall area of the mold cavity.

<4> The method for producing a shaped product according to any one of <1> to <3>, wherein the distance over which the molding material flows is longer than 1 mm but not longer than 100 mm.

<5> The method for producing a shaped product according to any one of <1> to <4>, wherein the molding material which is arranged on the mold is pre-formed before being cold-pressed.

<6> The method for producing a shaped product according to any one of <1> to <5>, wherein the discontinuous carbon fibers have an average fiber length of 1 mm to 100 mm.

<7> The method for producing a shaped product according to <6>, wherein the discontinuous carbon fibers in the molding material are two-dimensionally randomly oriented.

<8> The method for producing a shaped product according to any one of <1> to <7>, wherein a capacity V1 of the closable cavity and a volume V2 of the molding material satisfy $0.8 \leq V1/V2 \leq 1.2$.

<9> The method for producing a shaped product according to any one of <1> to <8>, wherein the opening is formed by at least one of stretching and flowing of the molding material during molding, (3) in the case where $D-L*\epsilon v>0$ holds, wherein $\epsilon v$ is a tensile rupture elongation of the molding material, L is a distance between outlet edges of the opening in a cross-section of the shaped product, and D is a creeping dimension of the opening in the cross-section, then (4) the molding material to be arranged has a length which includes both the distance L between outlet edges of the opening in the cross-section of the shaped product and a portion not smaller than $D-L*\epsilon v$, and (5) the tensile rupture elongation $\epsilon v$ of the molding material is higher than 110% and not higher than 300%.

<10> A shaped product obtained by the method for production according to any one of <1> to <9>, which is an automotive component.

<11> A shaped product obtained by the method for production according to any one of <1> to <9>, which includes an end part and a central part that is a portion other than the end part, the end part being the portion ranging from each end of the shaped product along a certain direction to a point corresponding to 10% of the overall length of the shaped product, and in which the isotropy i1 of the end part and the isotropy i2 of the central part satisfy $0.95<i1/i2<1.05$.

Advantageous Effects of the Invention

In the case of using the production method according to the invention, the step of cutting off excessive portions after press molding is not required, and the method involves neither a material loss nor a time loss.

Furthermore, even in cases when a molding material is arranged on a mold so that the molding material protrudes outward from the mold cavity, this molding material lies within the mold cavity after mold clamping. Because of this, the press molding can be completed while making the end parts of the molding material flow little or while minimizing the flow amount. There is no need of strictly regulating the shape of the molding material in accordance with the shape of the mold cavity. The shaped product does not have unevenness in fiber orientation or strength depending on portions thereof. Furthermore, in the shaped product produced, the peripheral portion thereof can have stable properties.

BRIEF DESCRIPTION OF THE DRAWINGS

FIG. 1A and FIG. 1B are schematic views for explaining projected areas of cavities of closable type mold as examples of the mold to be used in the invention.

FIGS. 2A and 2B are schematic views for explaining overall areas of cavities of closed type mold as examples of the mold to be used in the invention.

FIGS. 3A and 3B are schematic views for explaining overall areas of cavities of closed type mold as examples of the mold to be used in the invention.

FIGS. 4A and 4B are schematic views for explaining projected areas of molding materials as examples of the molding material to be used in the invention.

FIG. 18A is a schematic view which illustrates a mold and a molding material as still another embodiment of the invention; and FIG. 18B is a schematic view of a shaped product obtained using the mold of FIG. 18A.

FIGS. 19A and 19B are schematic views for explaining a method for measuring tensile rupture elongation εv.

FIG. 20B is a schematic view illustrating a state of the pre-formed molding material.

Figure 5A:
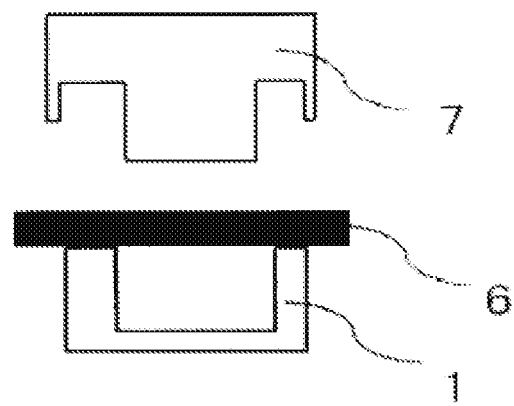
FIGS. 5A to 5D are schematic views which illustrate one mode of cold pressing according to the invention in which a closable type mold cavity is used.
Figure 5B:
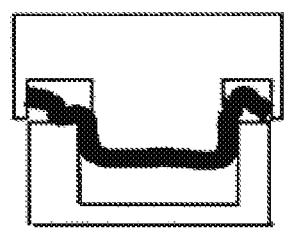

In some of the drawings (FIGS. 1-8, 12-17, 20, 21, and 22), the molds are each drawn as if the mold is open in the front and back directions thereof, for reasons of convenience of explanation. In these embodiments, however, each mold provides a closable cavity when the opposed mold (upper mold in the drawing) mates therewith in practical use.

EMBODIMENTS FOR CARRYING OUT THE INVENTION

The method of the invention for producing a shaped product is a method for producing a shaped product having an opening by arranging a molding material including discontinuous carbon fibers and a thermoplastic resin on a mold and cold-pressing the molding material, wherein (1) the mold has a portion serving as a closable cavity and (2) the molding material to be arranged on the mold has a projected area larger than the projected area of the mold cavity.

It is preferable in the method for producing the shaped product of the invention that in the cold pressing, the molding material should flow to form an end part of the shaped product.

[Carbon Fibers]

Generally known as carbon fibers are polyacrylonitrile (PAN)-based carbon fibers, petroleum-coal pitch-based carbon fibers, rayon-based carbon fibers, cellulose-based carbon fibers, lignin-based carbon fibers, phenol-based carbon fibers, vapor-grown carbon fibers, and the like. In the invention, carbon fibers of any of these types are suitable for use.

Preferred of these for use in the invention are polyacrylonitrile (PAN)-based carbon fibers, from the standpoint of the excellent tensile strength thereof. In the case of using PAN-based carbon fibers as the carbon fibers, the tensile modulus thereof is preferably in the range of 100 GPa to 600 GPa, more preferably in the range of 200 GPa to 500 GPa, even more preferably in the range of 230 GPa to 450 GPa. The tensile strength thereof is preferably in the range of 2,000 MPa to 10,000 MPa, more preferably in the range of 3,000 MPa to 8,000 MPa.

The carbon fibers to be used in the invention may be ones which have a sizing agent adherent to the surface thereof. In the case of using carbon fibers having a sizing agent adherent thereto, the kind of the sizing agent can be suitably selected in accordance with the kind of the carbon fibers and the kind of the matrix resin, and is not particularly limited.

[Fiber Length of the Carbon Fibers]

The fiber length of the carbon fibers to be used in the invention is not particularly limited so long as the carbon fibers are discontinuous carbon fibers, and can be suitably determined in accordance with the kind of the carbon fibers, the kind of the thermoplastic resin, the orientation state of the carbon fibers in the molding material, or the like. Usually, the average fiber length of the discontinuous carbon fibers is preferably in the range of 1 mm to 100 mm, and even more preferably 3 mm to 50 mm.

In the invention, carbon fibers which differ in fiber length from one another may be used in combination. In other words, the carbon fibers to be used in the invention may be ones which have a fiber length distribution having a single peak or may be ones which have a fiber length distribution having a plurality of peaks.

In the case where the carbon fibers to be used are ones obtained by cutting carbon fibers into a constant length with a rotary cutter or the like, the cut length is the average fiber length thereof. This average fiber length is the number-average fiber length and is also the weight-average fiber length.

When the length of each carbon fiber is expressed by $L_i$ and the number of carbon fibers measured is expressed by $j$, then the number-average fiber length ($L_n$) and the weight-average fiber length ($L_w$) are determined using the following expressions (c) and (d). (In the case of a constant cut length, calculation with expression (c), which is for number-average fiber length ($L_n$), also is calculation of the weight-average fiber length ($L_w$).)

$$L_n = \Sigma L_i / j \qquad \text{expression (c)}$$

$$L_w = (\Sigma L_i^2)/(\Sigma L_i) \qquad \text{expression (d)}$$

The average fiber length to be determined in the invention may be either number-average fiber length or weight-average fiber length.

Specifically, the number-average fiber length of the carbon fibers can be determined, for example, by randomly extracting 100 carbon fibers from the molding material, measuring the length of each of the carbon fibers with a vernier caliper or the like down to the order of mm, and calculating the average length on the basis of the following expression (c2). The extraction of carbon fibers from the molding material can be conducted, for example, after the molding material is subjected to a heat treatment of about 500° C. for 1 hour to remove the resin in the oven.

$$L_a = \Sigma L_i / 100 \qquad \text{expression (c2)}$$

[Fiber Diameter of the Carbon Fibers]

The fiber diameter of the carbon fibers to be used in the invention may be suitably determined in accordance with the kind of the carbon fibers, and is not particularly limited. For example, in the case of using carbon fibers as the carbon fibers, the average fiber diameter thereof is usually preferably in the range of 3 µm to 50 µm, more preferably in the range of 4 µm to 12 µm, even more preferably in the range of 5 µm to 8 µm.

The term average fiber diameter herein means the diameter of the single carbon fibers. Consequently, in the case of carbon fibers which are in the form of fiber bundles, that term means not the diameter of the fiber bundles but the diameter of the carbon fibers (single fibers) constituting the fiber bundles. The average fiber diameter of carbon fibers can be determined, for example, by the method described in JIS R-7670:2000.

[Degree of Opening]

Regardless of the kind thereof, the carbon fibers to be used in the invention may be composed of independent single fibers or may be in the form of fiber bundles each made up of a plurality of single fibers.

The carbon fibers to be used in the invention may be ones composed of independent single fibers alone or ones composed of fiber bundles alone, or may be ones including these two kinds of carbon fibers intermingled with each other. In the case of using carbon fibers in the form of fiber bundles, the fiber bundles may be substantially even in the number of single fibers constituting the bundle or may be different in the number thereof.

In the case where the carbon fibers to be used in the invention are in the form of fiber bundles, the number of the single fibers constituting each fiber bundle is not particularly limited. However, the number thereof is usually in the range of 1,000 to 100,000.

In general, carbon fibers are available in the form of fiber bundles each made up of several thousands to tens of thousands of single fibers (filaments) gathered together. In cases when carbon fibers in the form of fiber bundles are used as such, the portions where entangled fiber bundles are present may have a locally increased thickness, making it difficult to obtain a thin molding material. In order to avoid this problem, such carbon fibers are usually used after the fiber bundles are widened or opened.

In the case of opening the fiber bundles before use, the degree of opening of the opened fiber bundles is not particularly limited. It is, however, preferred to control the degree of opening of the fiber bundles so that the carbon fibers to be used include both carbon fiber bundles each made up of carbon fibers not less than a specific number and carbon fiber bundles each made up of a smaller number of carbon fibers or single fibers. In this case, it is specifically preferable that the carbon fibers to be used should be composed of: carbon fiber bundles (A) each made up of carbon fibers, the number of which is not less than the critical number of single fibers defined by the following expression (a); and carbon fibers which have undergone opening, i.e., carbon fibers in the form of independent single fibers or fiber bundles in each of which the number of carbon fibers is less than the critical number of single fibers.

Critical number of single fibers=600/$D$  expression (a)

($D$ is the average fiber diameter (µm) of single carbon fibers.)

In the invention, the proportion of the carbon fiber bundles (A) to all the carbon fibers in the molding material is preferably higher than 0 vol % and less than 99 vol %, more preferably 20 vol % or higher and less than 99 vol %, even more preferably 30 vol % or higher and less than 95 vol %, most preferably 50 vol % or higher and less than 90 vol %. This is because by causing carbon fiber bundles each made up of single fibers not less than the specific number to coexist with other fibers, which are single fibers or carbon fiber bundles that have undergone opening, in a specific proportion as shown above, the amount of carbon fibers present, i.e., the volume content of fibers, in a molding material can be increased. "Vol %" means "% by volume".

In the invention, the average number of fibers (N) of the carbon fiber bundles (A) is not particularly limited and can be suitably determined so long as the objects of the invention are not defeated thereby.

In the case of carbon fibers, the N is usually in the range of 1<N<12,000. It is, however, preferable that the N should satisfy the following expression (b).

$0.6 \times 10^4/D^2 < N < 6 \times 10^5/D^2$  (b)

($D$ is the average fiber diameter (µm) of single carbon fibers.)

[Volume Content of Carbon Fibers (Vf)]

The volume content of carbon fibers (hereinafter sometimes referred to simply as "Vf") in the shaped product to be produced by the production method of the invention is not particularly limited. However, it is preferable that the volume content of carbon fibers (Vf), which is defined by the following expression (d1) regarding the carbon fibers and the thermoplastic resin both included in the shaped product, should be 5 vol % to 80 vol %. More preferably, the Vf is 20 vol % to 60 vol %.

$Vf$=100*(volume of carbon fibers)/[(volume of carbon fibers)+(volume of thermoplastic resin)]  Expression (d1):

In cases when the Vf of the shaped product is 5 vol % or higher, a sufficient reinforcing effect is produced. In cases when the Vf is 80 vol % or less, the shaped product obtained is less apt to have voids therein and the possibility that the shaped product might have reduced properties is low.

[Forms of the Carbon Fibers]

The form of the carbon fibers in the invention is not particularly limited, and the carbon fibers may be either a three-dimensionally isotropic carbon fiber mat in which the major-axis directions of the carbon fibers have been randomly dispersed in the X, Y, and Z directions as a result of, for example, carbon fiber intertwining as in cotton, or carbon fibers randomly oriented two-dimensionally. More preferred are carbon fibers randomly oriented two-dimensionally.

The expression "randomly oriented two-dimensionally" herein means the state in which the carbon fibers have been disorderedly oriented, without being aligned in any specific direction(s), in the in-plane directions of the molding material and have been arranged within the plane of the sheet without showing any specific directional properties as a whole. Molding materials obtained using such discontinuous fibers randomly oriented two-dimensionally are substantially isotropic molding materials having no in-plane anisotropy.

A method for producing an isotropic molding material in which fiber bundles each made up of single carbon fibers bundled together in a given number or larger have been intermingled, in a given proportion, with either single fibers or fiber bundles in a state similar to single fibers is described in detail in International Publication WO 2012/105080, pamphlet and JP-A-2011-178890.

[Carbon Fiber Areal Weight]

The carbon fiber areal weight in the molding material is not particularly limited. However, the carbon fiber areal weight is preferably 25 g/m² to 10,000 g/m².

Although the thickness of the molding material to be used in the invention is not particularly limited, usually, the thickness thereof is desirably in the range of 0.01 mm to 100 mm, preferably in the range of 0.1 mm to 10 mm, more preferably in the range of 0.5 mm to 3.0 mm.

In the case where the molding material to be used in the invention has a configuration in which a plurality of layers is layered, that thickness is not the thickness of each layer but the sum of the thicknesses of these layers, i.e., the thickness of the whole molding material.

The molding material to be used in the invention may be one having a single-layer structure constituted of a single layer or may be one having a multilayer structure composed of a plurality of layers.

With respect to the form of the molding material having such a multilayer structure, the molding material may be one in which a plurality of layers having the same composition is layered or one in which a plurality of layers differing in composition from each other is layered.

[Thermoplastic Resin]

The thermoplastic resin to be used in the invention is not particularly limited so long as a molding material having desired strength can be obtained therewith. Thermoplastic resins suitably selected in accordance with applications of the molding material can be used.

The thermoplastic resin is not particularly limited, and thermoplastic resins having a desired softening point or melting point can be suitably selected and used in accordance with, for example, applications of the molding material.

As the thermoplastic resin, use is usually made of one having a softening point in the range of 180° C. to 350° C. However, the thermoplastic resin to be used is not limited to such resins.

Examples of the thermoplastic resin include polyolefin resins such as polyethylene resins, polypropylene resins, polybutamoldne resins, polymethylpentene resins, vinyl chloride resins, vinylidene chloride resins, vinyl acetate resins, and poly(vinyl alcohol) resins, styrene-based resins such as polystyrene resins, acrylonitrile/styrene resins (AS resins), and acrylonitrile/butamoldne/styrene resins (ABS resins), polyamide resins such as polyamide-6 resins (nylon-6), polyamide-11 resins (nylon-11), polyamide-12 resins (nylon-12), polyamide-46 resins (nylon-46), polyamide-66 resins (nylon-66), and polyamide-610 resins (nylon-610), polyester resins such as poly(ethylene terephthalate) resins, poly(ethylene naphthalate) resins, poly(butylene terephthalate) resins, poly(trimethylene terephthalate) resins, and liquid-crystal polyesters, polyacetal resins, polycarbonate resins, polyoxymethylene resins, (meth)acrylic resins such as poly(methyl methacrylate), polyarylate resins, poly(phenylene ether) resins, modified poly(phenylene ether) resins, thermoplastic polyimide resins, poly(amide-imide) resins, polyetherimide resins, polyethernitrile resins, phenoxy resins, poly(phenylene sulfide) resins, polysulfone resins, modified polysulfone resins, poly(ether sulfone) resins, polyketone resins, polyetherketone resins, polyetheretherketone resins, polyetherketoneketone resins, urethane resins, fluororesins such as polytetrafluoroethylene, and polybenzimidazole resins.

One thermoplastic resin may be used as the only thermoplastic resin in the invention, or two or more thermoplastic resins may be used in the invention. Examples of the embodiment in which two or more thermoplastic resins are used in combination include an embodiment in which thermoplastic resins differing in softening point or melting point are used in combination and an embodiment in which thermoplastic resins differing in average molecular weight are used in combination. However, the combined use of thermoplastic resins is not limited to these examples.

[Other Agents]

Various fibrous or non-fibrous fillers, such as glass fibers and organic fibers, and additives such as a flame retardant, UV stabilizer, pigment, release agent, softener, plasticizer, and surfactant may be contained in the molding material.

[Area of the Molding Material to be Arranged]

In the invention, the projected area of the molding material to be arranged on a mold is larger than the projected area of the cavity of the mold.

(Projected Area S1 of the Molding Material)

The projected area S1 of a molding material is the two-dimensional planar area of the molding material viewed from the mold opening/closing direction, and is, for example, the area indicated by 5 in FIG. 4A. Consequently, in the case where two molding materials are layered so that one of the molding materials lies completely inside the periphery of the other molding material when viewed from the mold opening/closing direction as shown in FIG. 4B, the projected area of the larger molding material is equal to the projected area of the two layered molding materials (5 in FIG. 4B). In this case, the projected area of the larger molding material alone is hence defined as the projected area S1 according to the invention. In the case where a plurality of molding materials are layered so as to overlap each other, the projected area of each molding material is not limited so long as the projected area of at least one of the molding materials is larger than the projected area of the mold cavity.

In the invention, the projected area of a molding material is the projected area of the molding material before heating the molding material. Incidentally, the heating of the molding material is performed just before the cold pressing as will be described later.

(Projected Area S2 of Mold Cavity)

The term mold cavity (also referred to simply as "cavity") means the space formed upon the clamping of two molds (e.g., an upper mold and a lower mold).

The projected area S2 of a mold cavity is the two-dimensional planar area of the cavity viewed from the mold opening/closing direction. For example, in the case of the molds 1 of FIGS. 1A and 1B (which illustrates lower molds each forming a closed mold cavity), the projected area of each mold cavity is the area indicated by 2 in FIGS. 1A and 1B. In the case of a cavity having a rugged shape, the projected area of this cavity is smaller than the developed area of the shaped product obtained.

The mold to be used in the invention is not limited, so long as this mold has a portion serving as a closable cavity and when this mold is clamped together with an opposed mold, the two molds are at least partly in contact with each other. The cavity may be a completely closed cavity or may be a cavity which partly includes an open portion. In the case of a cavity partly including an open portion, the projected area of that portion of the shaped product which is in contact with the lower mold at the time when cold pressing is completed is defined as the projected area S2 of the mold cavity.

Although the mold cavities (lower molds) 1 shown in FIGS. 1A and 1B and FIGS. 2A and 2B have a recessed shape, molds having a protrude shape are usable. In this case, the projected area S2 of the cavity of such a mold is defined in a manner similar to that described above.

Hitherto, in the invention described in JP-A-2012-250430, for example, a base having a size not larger than the projected area of the cavity of the mold is introduced and the molding material is caused to flow during press molding to thereby form a shaped product (including end parts of the shaped product). In this case, however, the flow-formed portions (including end parts of the shaped product) formed through flowing have undergone complicated flows of fibers due to the flow of the molding material. It is hence difficult to impart thereto the same properties regarding fiber orientation (fiber properties) as those of the portion which has not flowed (non-flow part). For example, there undesirably is a difference in fiber orientation between the shaped-product end parts (portions which have flowed) and the non-flow part which is a central part of the shaped product.

Figure 7A:
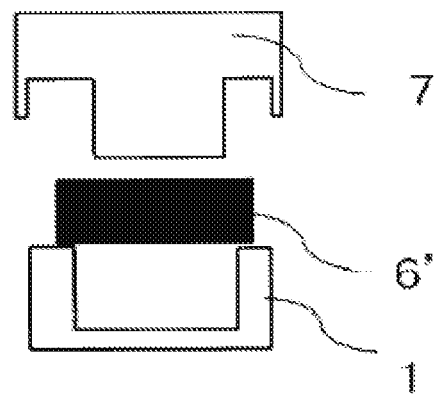
FIGS. 7A to 7D are schematic views illustrating cold pressing in which a molding material having a projected area not larger than the projected area of mold cavity is used.
Figure 7B:
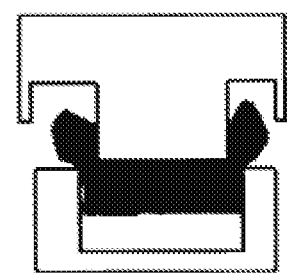
Figure 7C:
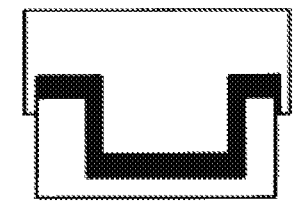
Figure 7D:
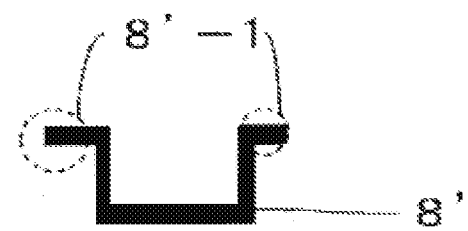

The term "shaped-product end parts formed through fiber flowing" means the portions formed as a result of the flow of the molding material (and the simultaneous flow of fibers) during the pressing, as shown, for example, by 8'-1 in FIG. 7D. In case where a molding material having a projected area S1 not larger than the projected area S2 of the mold cavity as shown in FIG. 7A is used, the shaped product undesirably has differences in fiber orientation and strength among portions thereof. In addition, since the end parts of the shaped product obtained have been formed as a result of the flow of the molding material, this shaped product has a difference in fiber orientation between the flow parts and the non-flow part. Namely, fiber orientation throughout the whole shaped product cannot be controlled, and the shaped product is uneven. For example, in case where a two-dimensionally isotropic molding material in which the carbon fibers are randomly oriented two-dimensionally is used and this molding material having a projected area not larger than the projected area of the mold cavity is introduced into a pressing machine, then the portions (flow-formed parts) formed as a result of the flow of the molding material and the shaped-product end parts undesirably have anisotropic mechanical properties. Similarly, in case where an anisotropic molding material is used and prepared so as to have a projected area not larger than the projected area of the mold cavity, a difference in anisotropy undesirably results between the non-flow part and the flow-formed parts.

Figure 5C:
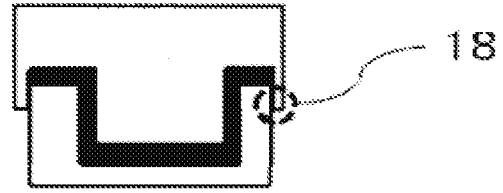
Figure 5D:
Figure 6A:
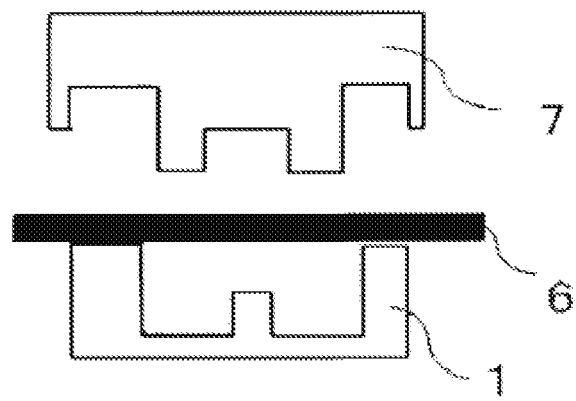
FIGS. 6A to 6D are schematic views which illustrate another mode of cold pressing according to the invention in which a closable type mold cavity is used.
Figure 6B:
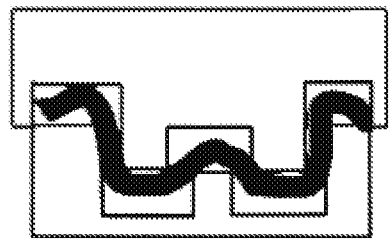
Figure 6C:
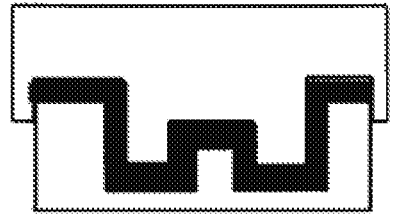
Figure 6D:

Meanwhile, in the present invention, since the projected area S1 of the molding material to be arranged on a mold is larger than the projected area S2 of the mold cavity as shown in FIG. 5A and FIG. 6A, most of the molding material does not flow. Furthermore, by regulating the volume of the molding material in advance, the molding material is made to be drawn into the cavity during press molding as shown in FIGS. 5B and 5C and FIGS. 6B and 6C. Consequently, the end parts of the shaped product flow little or flow only slightly, when press-molded. As a result, the shaped product obtained (FIGS. 5C and 5D) and FIGS. 6C and 6D) has even properties throughout all the portions thereof, and the central part and the end parts are even. For convenience of explanation, the views in FIGS. 5A to 5D and FIGS. 6A to 6D have been drawn so that the molding materials are two-dimensionally drawn into the cavities. However, the molding materials each may be drawn into the cavity in all of the three-dimensional directions.

The reason why the projected area of the molding material to be arranged on a mold is expressed in terms of size (or the charge ratio which will be described later) relative to not the overall area S3 of the mold cavity but the projected area S2 of the mold cavity is that in case where a molding material having a size not less than the overall area of the mold cavity is introduced, the molding material undesirably protrudes outward from the closed cavity, making it impossible to form end parts while causing the end parts of the molding material to flow only slightly.

Furthermore, although use of molding materials having an area exceeding the projected area of the mold cavity usually results in a material loss through the forming (see, for example, JP-A-2011-218798), the occurrence of material loss is little in the present invention.

Specifically, in the forming described in JP-A-2011-218798, end parts of the desired shaped product are not formed because of the use of an open cavity and a trimming step is essential after the forming, resulting in a material loss. Meanwhile, in the present invention, since the mold has a portion serving as a closable cavity, the cavity is filled with the molding material in a necessary and sufficient amount up to the end parts of the desired shaped product, at the time when the forming has been completed. The occurrence of material loss is hence little in the invention.

It is preferable that the molding material should be arranged on a mold so that the charge ratio represented by the following expression (e) is higher than 100% and not higher than 250%, although the charge ratio depends on the shape of the mold. The charge ratio thereof is more preferably higher than 100% and not higher than 160%, and is even more preferably higher than 100% and not higher than 140%.

Charge ratio (%)=100*(projected area $S1$ of molding material)/(projected area $S2$ of mold cavity)  expression (e)

(Flow of the Molding Material)

In the method for producing a shaped product according to the invention, since the projected area S1 of the molding material to be arranged on a mold is larger than the projected area S2 of the mold cavity, the shaped-product end parts flow little or flow only slightly, when press-molded.

The term "flow of a molding material" means the phenomenon in which the molding material, when pressed by an upper mold, is caused to flow or move thereby. Namely, that term means the phenomenon in which the molding material flows or moves during the period from initiation of pressing (after completion of stretching) to completion of the forming.

In this description, the flow of a molding material and the stretching thereof are different phenomena, and the term "stretching of a molding material" means the phenomenon in which the molding material is stretched before being pressed. A detailed explanation on the stretching of the molding material will be given later in the section (Tensile rupture elongation $\epsilon v$).

It is preferable that the molding material according to the invention should flow during cold pressing to form end parts of a shaped product, and it is preferable that the distance over which the molding material flows during the pressing should be longer than 0 mm but not longer than 150 mm.

The method for producing a shaped product preferably is one in which the upper limit of the distance over which the molding material flows is 100 mm. The upper limit thereof is more preferably 80 mm, even more preferably 50 mm, most preferably 40 mm.

Meanwhile, the lower limit of the distance over which the molding material flows is preferably 1 mm, more preferably 5 mm, even more preferably 10 mm.

In this case, since the projected area S1 of the molding material arranged on the mold is larger than the projected area S2 of the mold cavity, the end parts of the molding material flow slightly during the forming although most of the molding material does not flow.

In the case where a shaped product is to be produced in such a manner that the molding material does not flow at all, it is necessary to conduct pre-forming in which the molding material is strictly regulated so as to have a shape conforming to the shape of the mold cavity, before press molding the molding material.

Strictly regulating the shape of the molding material so as to conform to the mold has the following drawbacks. In the case where the molding material is conveyed by a robot, considerable man-hours are necessary for the initial adjustment for molding material positioning. Meanwhile, in the case where the molding material is conveyed and arranged on the mold by man power, a highly skilled worker is required. Consequently, molding materials which must be arranged in a precise position without even a slight deviation are exceedingly undesirable from the standpoint of production.

In cases when a molding material is caused to flow over a distance longer than 0 mm but not longer than 150 mm to form the end parts of a shaped product, not only there is no need of strictly regulating the molding material so as to have a shape conforming to the shape of the mold cavity but also a shaped product can be produced without pre-forming.

Furthermore, in the method for producing a shaped product according to the invention, since the projected area S1 of the molding material to be arranged on a mold is larger than the projected area S2 of the mold cavity, the molding material does not flow over a long distance. Because of this, most portions of the shaped product produced have even fiber orientation.

For example, by producing a shaped product so that the end parts thereof are the only portions formed through flowing as shown in FIGS. 20A to 20D, the press molding can be facilitated.

Preferred ranges of the distance over which the molding material flows are as shown above. So long as the distance over which the molding material flows is within the range according to the invention, the shaped-product end parts (portions formed through flowing) and the shaped-product central part (non-flow portion) do not differ considerably in fiber configuration. Such flow distance is hence preferred.

Incidentally, in the shaped product produced, in cases when the region ranging from each end of the shaped product along a certain direction to the point corresponding to 10% of the overall length of the shaped product is taken as an end part and the other portion is taken as a central part, then it is preferable that the isotropy i1 of the end part and the isotropy i2 of the central part should satisfy $0.95<i1/i2<1.05$.

The term "flow" in the invention means the flow of the molding material in in-plane directions, and the molding material may flow in the plate thickness direction but need not flow in the plate thickness direction. The method for producing a shaped product according to the invention can yield a shaped product in which the peripheral portions have stable properties, without requiring the molding material to have a shape strictly conforming to the shape of the mold cavity, by causing the molding material to flow in in-plane directions.

Meanwhile, plate-thickness-direction flow may be suitably selected in the case where an increased thickness or a reduced thickness is desired to be partly imparted to the shaped product.

Incidentally, the in-plane directions of a molding material are directions which are perpendicular to the plate thickness direction of the molding material. In contrast to the longitudinal direction or transverse direction, which indicates a definite direction, the term "in-plane directions" means indefinite directions on the same plane (parallel planes perpendicular to the plate thickness direction).

(Overall Area S3 of Mold Cavity)

The overall area S3 of a mold cavity is the surface area of the portion which constitutes the cavity of the mold. When explained using, for example, FIG. 2 and FIG. 3 (which illustrate lower molds each forming a closed mold cavity), the overall area S3 of a mold cavity is the area of the blackened portion indicated by 3 in FIG. 2A or 2B or the area of the broken-line portion indicated by 4 in FIG. 3A or 3B.

Since the mold according to the invention in not limited so long as the mold has a portion serving as a closable cavity, this cavity may partly include an open portion. In the case of a mold cavity partly including an open portion, the area of that portion of the shaped product which is in contact with the lower mold at the time when the cold pressing has been completed is defined as the overall area S3 of this mold cavity.

Figure 8A:
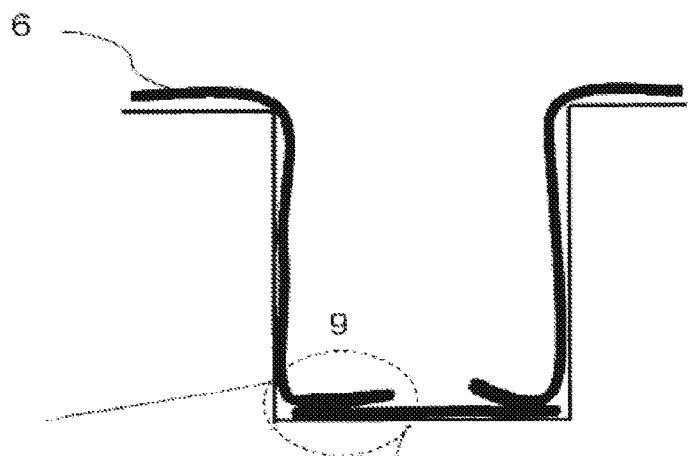
FIGS. 8A and 8B are schematic views illustrating the inside of a mold cavity in which the molding material is partly folded.
Figure 8B:
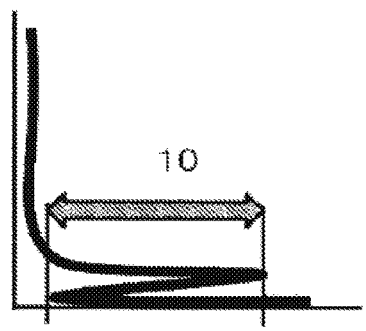

In cases when a molding material (6 in FIG. 8A) to be formed is folded as shown by 9 in FIG. 8A, there are cases where this molding material has a projected area not less than the area of the mold cavity. For example, in the portion indicated by the arrow 10 in FIG. 8B, the layered part of the molding material has an area about 3 times the area of the corresponding portion of the mold. In the case where the molding material includes a layered portion during forming, it is preferable that the projected area of this molding material should be up to 3 times the overall area S3 of the mold cavity, although the upper limit depends on the shape of the mold.

The upper limit of the projected area of the molding material to be arranged on a mold is preferably up to 1.5 times the overall area S3 of the mold cavity, more preferably up to 1.3 times, even more preferably up to 1.2 times, especially preferably up to 1.0 time, although the upper limit thereof depends on the shape of the mold cavity.

Meanwhile, a lower limit of the projected area of the molding material relative to the overall area S3 of the mold cavity is preferably such that $0.7 \leq S1/S3$, more preferably such that $0.8 \leq S1/S3$.

More specifically, in view of the facts that the molding material is stretched by pre-forming or the like and that there are cases where an additional molding material is superposed before forming, it is preferable that S1 should satisfy $0.8 \leq S1*(\text{tensile rupture elongation } \epsilon v)/S3$. From the standpoint of ease of disposition of the molding material, S1 more preferably satisfies $0.9 \leq S1*(\text{tensile rupture elongation } \epsilon v)/S3$, even more preferably satisfies $1.0 \leq S1*(\text{tensile rupture elongation } \epsilon v)/S3$.

[Shape of the Shaped Product]

Figure 9A:
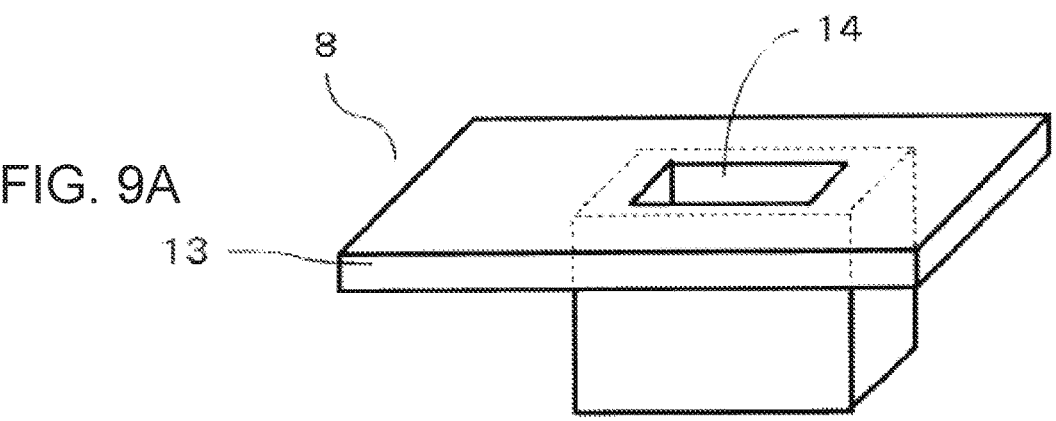
FIG. 9A is a schematic view (slant view) which illustrates an example of shaped products obtained using the production method of the invention.
Figure 9B:
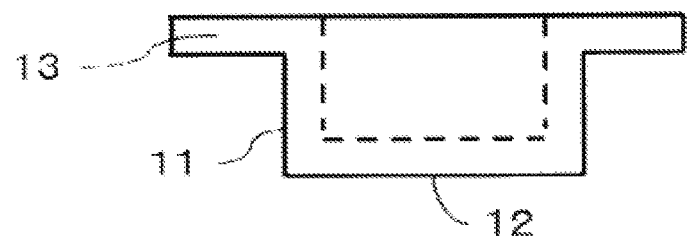
FIG. 9B is a side view of the shaped product of FIG. 9A.
Figure 9C:
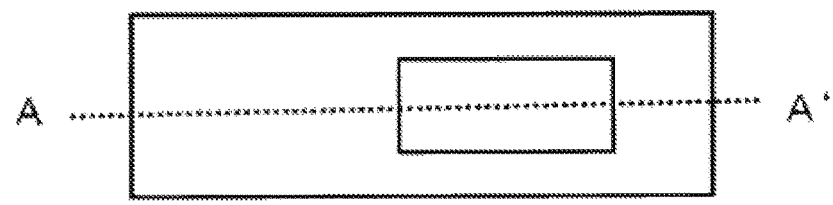
FIG. 9C is a plan view of the shaped product of FIG. 9A.
Figure 10:
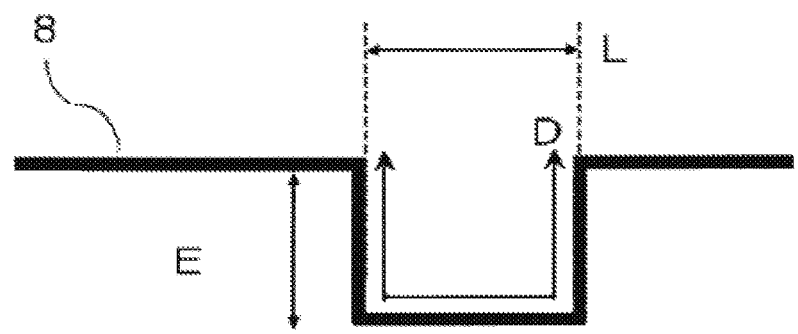
FIG. 10 is a schematic cross-sectional view of an example of shaped products obtained using the production method of the invention.

The shaped product to be produced in the invention has an opening. The opening possessed by the shaped product according to the invention may be an opening which, when viewed from a cross-sectional direction (in-plane direction), forms one closed space when closed. Typically, such an opening is a recess. A slant view of a shaped product 8 as an example is shown in FIG. 9A. The shaped product 8 shown in FIG. 9A has an opening 14. FIG. 9B is a side view of the shaped product 8 of FIG. 9A, and FIG. 9C is a plan view of the shaped product 8 of FIG. 9A. The shaped product 8 having an opening 14 has a wall surface part 11, a top surface part 12, and a flange part 13. A cross-sectional view taken on the line A-A' of FIG. 9C is shown in FIG. 10.

FIGS. 9A to 9C illustrate an opening which forms one closed three-dimensional space when closed. However, even in the case of a shaped product which is open in each of the directions perpendicular to the page, as in the case of, for example, FIG. 10 or FIG. 11, an opening thereof is the opening according to the invention so long as closing the opening results in one closed space when viewed from a cross-sectional direction (in-plane direction).

[Capacity V1 of Closable Cavity and Volume V2 of the Molding Material]

It is preferable that the capacity V1 of the closable cavity and the volume V2 of the molding material should satisfy 0.8≤V1/V2≤1.2.

The capacity V1 of the closable cavity is the volume of the space formed when the mold is closed, and is a value of the space volume which has been set so as to result in a shaped product having a desired plate thickness (wall thickness). The volume V2 of the molding material is the volume of the molding material itself prepared for producing the shaped product.

In cases when the capacity V1 of the closable cavity and the volume V2 of the molding material satisfy V1/V2≤1.2, this relationship is preferred because the shaped product is less apt to have unfilled areas in the end parts. In cases when 0.8≤V1/V2 is satisfied, this relationship is preferred because it is easy to evenly close the mold to a desired position and it is easy to produce a shaped product having an even plate thickness (wall thickness). It is more preferable that 1.0≤V1/V2≤1.1 should be satisfied.

In the case where the mold according to the invention partly includes an open portion, the volume of the shaped product at the time when the cold pressing has been completed is defined as the capacity V1 of the cavity.

[Shape of the Opening and Additional Disposition of Molding Material]

The shape of the opening (14 in FIGS. 9A to 9C) in the invention is not particularly limited. However, too large depths (E in FIG. 10) of the opening cause a new problem in that the amount of the molding material is insufficient and the wall surface part (11 in FIGS. 9A to 9C) cannot be formed.

It is therefore preferable that the molding material should be stretched and/or flow during the forming to thereby form the opening, and that (3) in the case where D−L*εv>0 holds, wherein εv is the tensile rupture elongation of the molding material, L is the distance between outlet edges of the opening in a cross-section of the shaped product, and D is the creeping dimension of the opening in the cross-section, then (4) the molding material to be arranged should have a length which includes both the distance L between outlet edges of the opening of the shaped product and a portion not smaller than D−L*εv and (5) the tensile rupture elongation εv of the molding material should be higher than 110% and not higher than 300%.

(Shape of the Opening and Problem)

Figure 11:
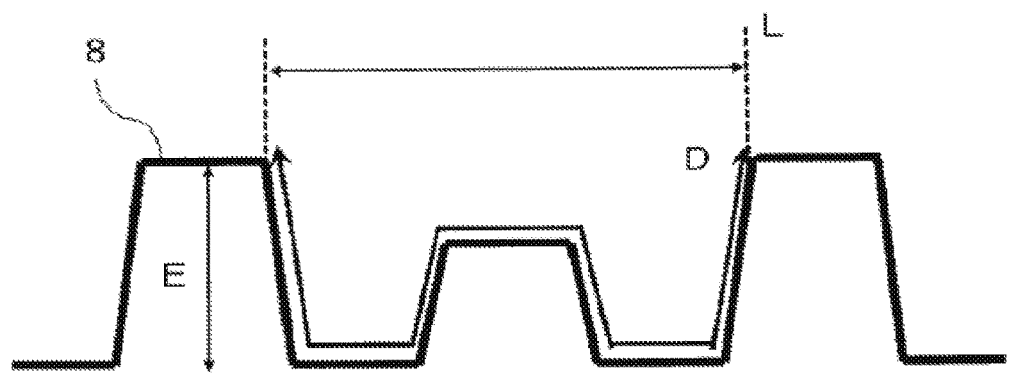
FIG. 11 is a schematic cross-sectional view of another example of shaped products obtained using the production method of the invention.
Figure 12A:
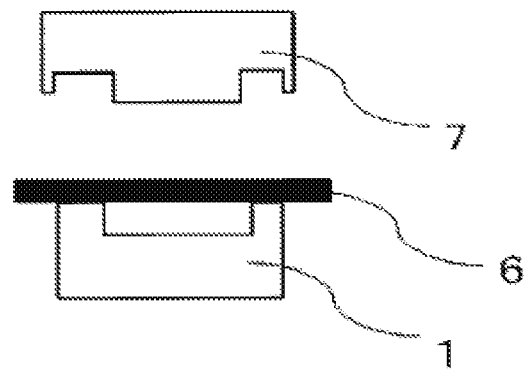
FIGS. 12A to 12D are schematic views illustrating one mode of cold pressing in which $D-L*\epsilon v<0$.
Figure 12B:
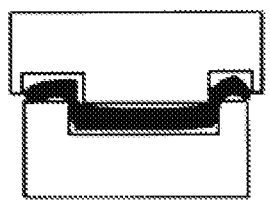
Figure 12C:
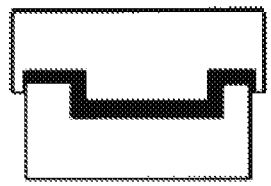
Figure 12D:
Figure 13A:
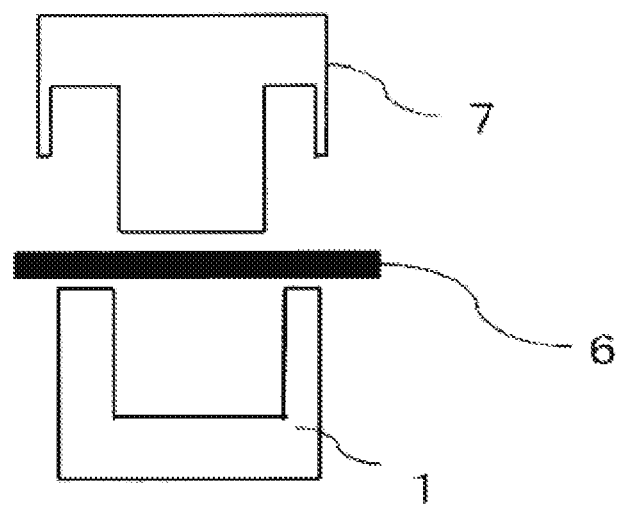
FIGS. 13A and 13B are schematic views illustrating the case where D–L*εv>0 and where a molding material having a length not larger than L is arranged and cold-pressed.
Figure 13B:
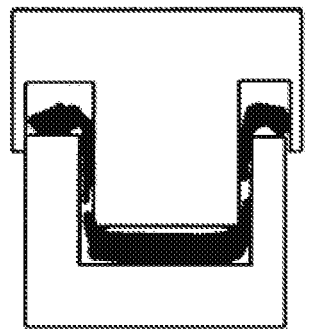

The distance L between outlet edges of the opening in a cross-section of a shaped product is the straight-line distance between the outlet edges viewed from an opening direction, in the case where the opening of the shaped product has a cross-section such as, for example, that shown in FIG. 10. In the case where the shaped product has a complicated rugged shape as shown in FIG. 11, the distance L is considerably shorter than the developed distance in the shaped product.

Meanwhile, the creeping dimension D between the outlet edges of the opening of the shaped product is the total length measured along the surface of the opening of the shaped product. The distance L and the creeping dimension D are measured with respect to the opening in the same cross-section. In the case where the shaped product has a complicated shape and there are hence a plurality of values of the distance L or creeping dimension D depending on the manner of measurement, a new problem in the invention arises in that the amount of the molding material for the wall surface part is apt to be insufficient when the opening includes even a single portion which satisfies the requirement (3).

(Tensile Rupture Elongation εv)

The tensile rupture elongation εv of the molding material according to the invention is not particularly limited. However, the tensile rupture elongation εv thereof is preferably higher than 110% and not higher than 300%, more preferably higher than 110% and not higher than 260%, even more preferably higher than 110% and not higher than 230%.

The term "tensile rupture elongation εv of a molding material" means the elongation of the molding material measured while stretching the molding material at a pulling speed of 20 mm/sec at a temperature at which the molding material can be cold-pressed. The tensile rupture elongation εv is represented by the following expression (f).

$$\varepsilon v = [(\text{length of the molding material after stretching } (y))/(\text{length of the molding material before stretching } (x))] \times 100 \quad \text{Expression (f):}$$

Specifically, the molding material is heated to a temperature at which cold pressing is possible (temperature at which forming is possible), and is arranged on one of the pressing molds for measuring tensile rupture elongation which are shown in FIGS. 19A and 19B. The molds are closed at a mold clamping speed of 20 mm/sec until the molding material is ruptured. Thereafter, the molding material is taken out, and the length (y) of the stretched molding material is measured. This length (y) is divided by the length (x) of the molding material which has not been stretched, thereby calculating the tensile rupture elongation εv. The temperature at which cold pressing is possible (temperature at which forming is possible) may be any temperature not lower than the softening temperature of the thermoplastic resin contained in the molding material. In the case where the thermoplastic resin is, for example, nylon-6, that temperature may be any temperature not lower than the melting point thereof but not higher than 300° C.

In the case where the tensile rupture elongation εv is 300% or less, the dimension D (FIG. 10, FIG. 11) can be extended to D=L*300% without additional disposition of a molding material.

Specifically, in the case where the molding material is prepared within the range of the tensile rupture elongation εv (i.e., in the case where D−L*εv<0), this molding material can be stretched during forming. Consequently, shaped products such as, for example, those shown in FIG. 10 and FIG. 11 in which the distance E from the top surface part to the inlet of the opening is 5 mm or longer and L is 10 mm or less or in which E is 10 mm or longer and L is 20 mm or less can be formed without arising any problem.

Incidentally, the tensile rupture elongation εv is affected by the content of carbon fibers, fiber length, fiber diameter, or the like, and there is a tendency that the tensile rupture elongation εv becomes lower as the content of carbon fibers increases, the fiber length increases, and the fiber diameter decreases.

(Preferred Length of the Molding Material to be Arranged)

The molding material is heated to at least the plasticating temperature before being press-molded. Because of this, in the case of a molding material in which the tensile rupture elongation εv is high to some degree or in the case where the value of D is small to some degree as compared with L*εv, then D−L*εv<0 is held and the molding material can be stretched, before initiation of pressing, to the length D so long as the length of the molding material is not less than the distance L described above. This molding material can hence be formed without arousing any problem (see FIGS. 12A to 12D). The term "stretching of a molding material" herein means the phenomenon in which the molding material is stretched before the molding material is pressed. Whether the molding material is being pressed or not can be ascertained with a pressure gauge, which is usually provided to the molds. The phenomenon in which the molding material is stretched when this pressure gauge reads substantially 0 is called "stretching", while the phenomenon in which the molding material flows or moves when a pressure is detected by the pressure gauge is called "flow".

Meanwhile, in the case of a molding material having a small value of tensile rupture elongation εv or in cases when the value of D is exceedingly large, then there are cases where D−L*εv>0 is held. In this case, the molding material cannot be stretched to D and may rupture before being pressed (see FIG. 13B). It is therefore preferable that in the case where D−L*εv>0 is held, the length of the molding material to be arranged should include both the distance L between outlet edges of the opening of the shaped product and a portion not smaller than D−L*εv. With respect to this length of the molding material mentioned in (4), the length of the single molding material itself may be regulated (for example, FIG. 15) or another molding material may be prepared and used for length regulation (for example, FIG. 14). With respect to the position where one or more molding materials are arranged, molding materials may be layered as shown in FIG. 14, or a molding material may be arranged so as to be partly pushed into the mold cavity as shown in FIG. 15.

Figure 14:
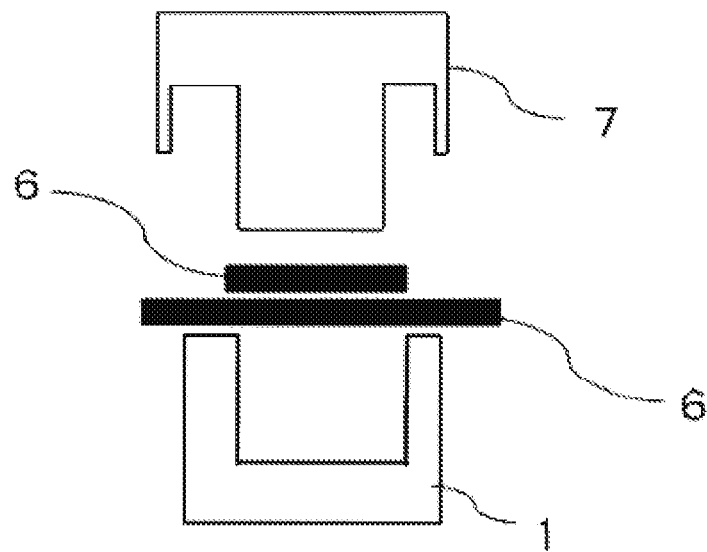
FIG. 14 is a schematic view illustrating the case where D–L*εv>0 and where a molding material having both the distance L between outlet edges of the opening in a cross-section of the shaped product and a portion not smaller than D–L*εv is arranged as a lamination with another molding material.
Figure 15:
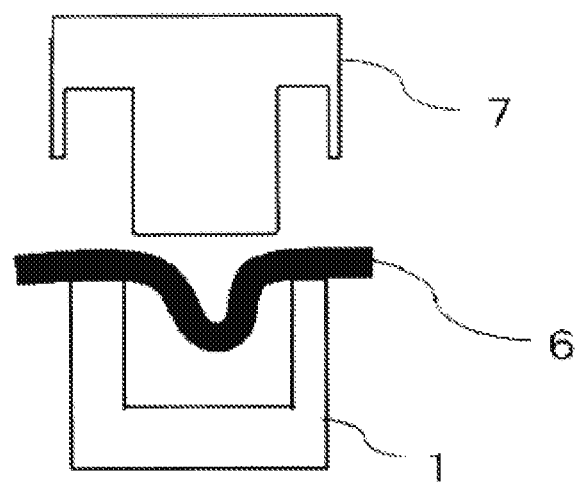
FIG. 15 is a schematic view illustrating the case where D–L*εv>0 and where a molding material having both the distance L between outlet edges of the opening in a cross-section of the shaped product and a portion not smaller than D–L*εv has been arranged in the mold by pushing the molding material thereinto.

In the case where molding materials are arranged in a layered state as shown in FIG. 14, the layered molding materials come to have an even plate thickness as a result of flow. This is because the layered molding materials, during pressing, flow not only in in-plane directions but also in the plate thickness direction. Meanwhile, in the case where a molding material is arranged so as to be partly pushed into the mold cavity as shown in FIG. 15, the stretching of the molding material can be reduced, and the top surface part and the wall surface part can have even fiber configuration.

[Other Shape of the Shaped Product]
(Flange Structure)

It is preferable that the shaped product to be produced by the invention should have a flange part, and the relationship between the thickness t1 of the wall surface part of the opening and the thickness t2 of the top surface part or flange part is preferably 0.5<t1/t2≤1.5, more preferably 0.7<t1/t2≤1.

For example, in the molding method described in JP-A-2009-196145, there frequently are cases where the wall surface part undesirably has a smaller volume than the top surface part of the opening, and the shapes of, for example, bosses or ribs on the wall surface part are relatively more difficult to form than on the top surface part.

(Properties of the Shaped Product)

The shaped product according to the invention is one in which the end parts are portions where the molding material, during the forming, did not flow at all or flowed only slightly. Because of this, there is substantially no difference in the isotropy of the molding material between the end parts and the central part of the shaped product. Specifically, it is possible to produce a shaped product which includes an end part and a central part and in which the isotropy i1 of the end part and the isotropy i2 of the central part satisfy 0.95<i1/i2<1.05. The end part of the shaped product is defined as the portion ranging from an end of the shaped product along a certain direction to the point corresponding to 10% of the overall length of the shaped product. There are two end parts along the direction, and the portion other than the end parts is defined as the central part.

For evaluating the isotropy of an end part and that of the central part, use was made of a method in which dumbbell specimens were cut out of the end part and central part of the shaped product and examined for tensile strength in accordance with JIS K7164:2005. The tensile strength (i1) of the end part was divided by the tensile strength (i2) of the central part to evaluate the isotropy.

[Molds]

The present invention relates to a method in which a molding material including discontinuous carbon fibers and a thermoplastic resin is arranged on a mold and molded by cold pressing. The kind of the press molding can be selected in accordance with the shaped product to be obtained. Press molding is a technique in which any of various materials, e.g., metals, plastic materials, and ceramic materials, is deformed by bending, shearing, compression, and the like using a processing machine and molds, tools, or the like to thereby obtain a shaped product. Examples of embodiments of the molding include drawing, deep drawing, flanging, corrugating, edge curling, and mold punching.

The mold in the invention has a portion serving as a closable cavity. The closable cavity structure in the invention is a structure capable of forming one closed space when a core mold and a cavity mold, or in other words, an upper mold and a lower mold, mate with each other. For example, in cases when the mold has a closable portion such as that shown in FIGS. 5A to 5D or FIGS. 6A to 6D, the shaped-product end parts corresponding to that portion have stable properties.

The mold may be one having a cavity which is partly open, although this mold is not shown. It is, however, more preferable from the standpoint of mold production that a completely closed cavity should be formed upon mold closure.

Namely, the term "closable cavity" in the invention does not mean a closed space. In other words, the expression "the mold has a portion serving as a closable cavity" in the invention means that the mold "has a portion around which the molds are closed so that the molding material does not flow out of the mold cavity during cold pressing".

(Clamping Speed)

There are no particular limitations on the clamping speed for the mold according to the invention. However, the clamping speed is preferably in the range of 10 mm/sec to 100 mm/sec. In the case of, in particular, the deep-drawn parts indicated by E in FIG. 10 and FIG. 11, a clamping speed of 100 mm/sec or less enables the molding material to be easily stretched and renders the molding material less apt to break in the course of the clamping, although this tendency depends on the shape of the shaped product. In cases when the clamping speed is 10 mm/sec or higher, the molding material is less apt to be cooled before completion of the stretching of the molding material, and shows improved formability. A preferred range of the clamping speed is 30 mm/sec to 100 mm/sec.

[Cold Pressing]

The cold pressing in the invention is a procedure for press molding which includes the following steps (i) to (iv).

Step (i): A step in which the molding material is heated to or above the plasticating temperature (temperature at which cold pressing is possible) of the thermoplastic resin as a constituent component of the molding material.

Step (ii): A step in which the molding material heated to or above the plasticating temperature is conveyed and arranged on one of opened molds.

Step (iii): a step in which the molds are clamped to thereby press the molding material, and the molding material is cooled to or below the plasticating temperature.

Step (iv): A step in which the molds are opened, and the shaped product is taken out of the molds.

The plasticating temperature of the thermoplastic resin in step (i) can be determined by DSC (differential scanning calorimetry). A measurement is made at a heating rate of 10° C./min, and the temperature corresponding to the top of the melting peak in the DSC curve obtained is taken as the plasticating temperature.

Step (ii) is a step in which the molding material heated to or above the plasticating temperature is conveyed and arranged on the lower mold of opened molds. The heated molding material is conveyed by man power or by a robot, etc., and arranged on one of the opened molds. Man power or a robot may be suitably selected for the conveyance, from the standpoints of the safety of operation and the accuracy of the disposition of the molding material on the mold in which press molding is performed.

Step (iii) is a step in which the molds are clamped to thereby cool the molding material, which has been heated to or above the plasticating temperature, to a temperature not higher than the plasticating temperature. Press molding is used in the step for pressing and cooling, and the kind thereof can be selected in accordance with the shaped product to be obtained. Press molding is a technique in which any of various materials, e.g., metals, plastic materials, and ceramic materials, is deformed by bending, shearing, compression, or the like using a processing machine and molds, tools, or the like to thereby obtain a shaped product. Examples of modes of the forming include drawing, deep drawing, flanging, corrugating, edge curling, and mold punching. Examples of methods for press molding include mold pressing, rubber pressing (isostatic pressing), and the like, in which forming is conducted using molds. Press molding with metallic molds may be performed, among those press molding methods, from the standpoint of freedom of selecting forming pressure and temperature.

It is preferable that the pressure applied to the projected area of the cavity of the opening of the mold in which a shaped product is formed should be in the range of 0.1 MPa to 50 MPa, from the standpoints of ease of shaping the plasticated molding material and ease of controlling the wall thickness of the shaped product. In particular, a pressure in the range of 5 MPa to 30 MPa is preferred from the standpoint of the cost of the equipment including the press molding machine.

The temperature not higher than the plasticating temperature may be a temperature lower by 20° C. to 100° C. than the solidification temperature of the thermoplastic resin as a constituent component of the molding material, and performing the step at a mold temperature within that range is preferred from the standpoints of ease of shaping the plasticated molding material and the surface appearance of the shaped product. Examples of preferred modes include ones in which a temperature in the range of 120° C. to 160° C. is used for the case of using a polyamide-6 resin as the thermoplastic resin and ones in which a temperature in the range of 80° C. to 120° C. is used for the case of using a polypropylene resin as the thermoplastic resin.

Step (iv) is a step in which after the cooling, the molds are opened and the shaped product is taken out of the molds.

In the case where a step for operating an ejector is included between step (iii) and step (iv) for the purpose of helping the step (iv), this procedure is preferred from the standpoint that the forming operation can be simplified and forming troubles and the like can be avoided. The ejector may be of the type in which compressed air is blown or the type in which a mechanical structural member is used for pushing up. Either type can be advantageously used.

[Pre-Forming]

In the method for producing the shaped product in the invention, it is preferable that after the molding material has been arranged on a mold, the molding material should be pre-formed and then press-molded by cold pressing. The pre-forming is the operation of forming beforehand the molding material to a shape akin to that of the shaped product, and is conducted for the purpose of facilitating placement in the mold and subsequent press molding. For example, in the case of forming with molds such as those shown in FIGS. 20A to 20C, the pre-forming is the operation of arranging beforehand the molding material so that the molding material conforms to the rugged shape of the molds. This pre-forming improves formability and facilitates flow control.

EXAMPLES

The present invention is explained below in more detail by reference to Examples. The raw materials used in the Examples are as follows.

PAN-based carbon fibers

Polyamide-6 (melting point, 225° C.; heat decomposition temperature (in air), 300° C.)

[Various Evaluation Methods and Forming Conditions]

(Shapes of Molds)

Figure 16A:
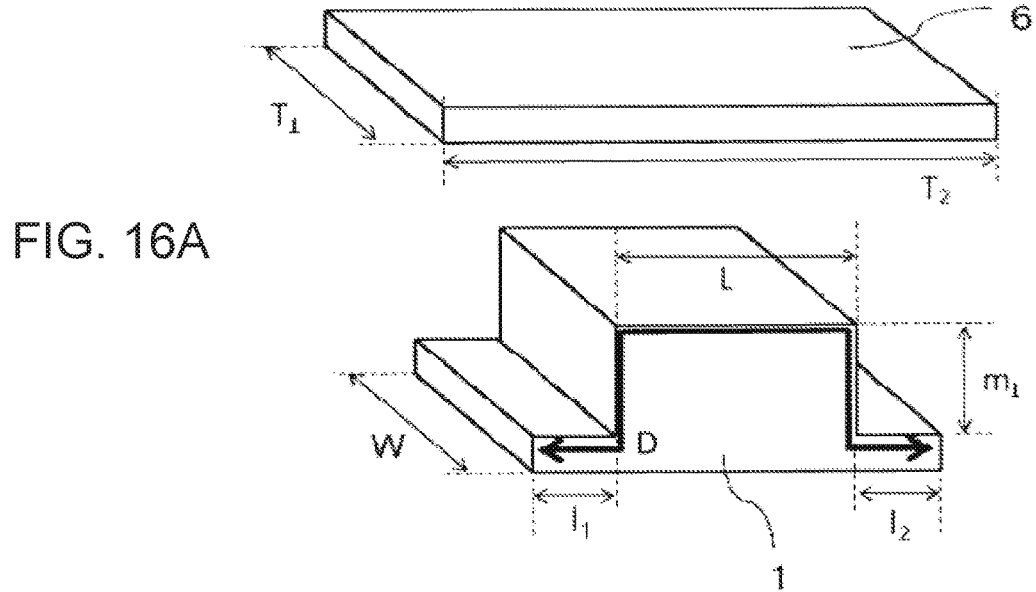
FIG. 16A is a schematic view which illustrates a mold and a molding material as one embodiment of the invention.
Figure 17A:
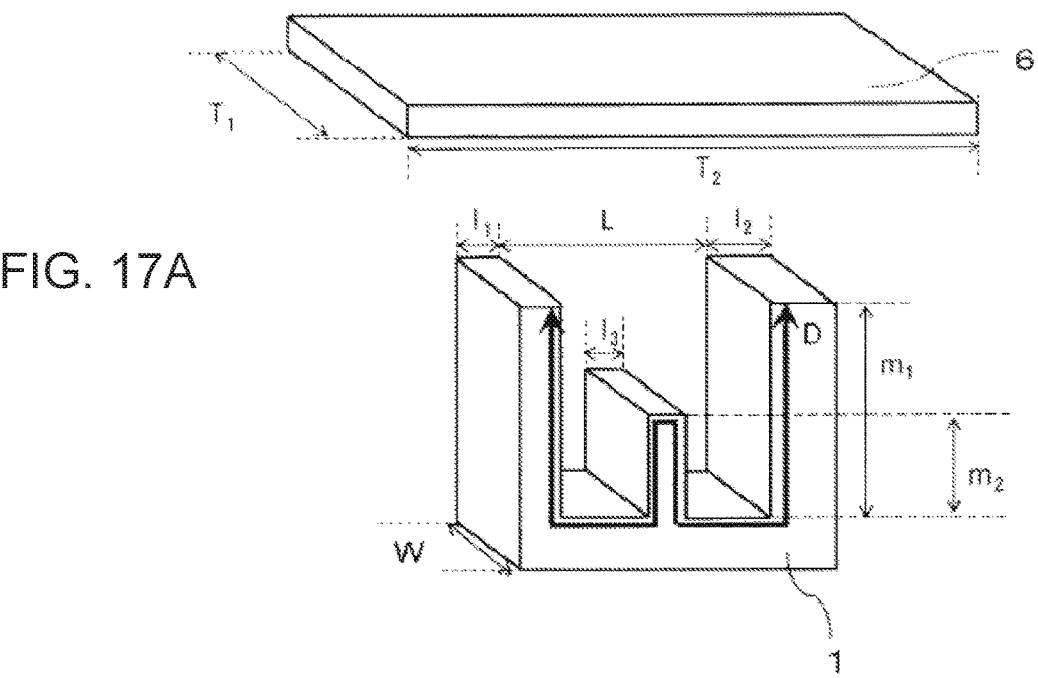
FIG. 17A is a schematic view which illustrates a mold and a molding material as another embodiment of the invention.

The molds shown by 1 in FIG. 16A, by 1 in FIG. 17A, and by 1 in FIG. 18A were used as molds for press molding. The dimensions, capacity of the closable cavity, etc. of each mold are shown in Tables 1 to 5. With respect to each mold, an upper mold and a lower mold were designed so that the cavity constituted a completely closed space and included no open portion.

The mold of FIG. 16A had, in the $T_1$ dimension direction, a structure called normal shear, in which the upper mold had shear edges. This structure was designed to have a shear edge height which was low to some degree, in order to make it easy to evaluate molding material biting.

Meanwhile, the mold of FIG. 17A had, in the $T_2$ dimension direction, a structure called reverse shear, in which the lower mold had shear edges. This structure hence had a shape which was substantially free from the biting of molding materials by the molds.

(Method for Evaluating Flow Distance)

A line was drawn beforehand at an end of a molding material which had not been heated, and the distance between the line and the end of the shaped product formed was measured.

In each of the Examples and Comparative Examples, the measurement of flow distance was made with respect to two cases, i.e., "the case where pre-forming was strictly performed" and "the case where strict pre-forming was not performed (the case where a molding material was slightly loosely arranged)".

In "the case where pre-forming was strictly performed", the molding material was partly cut and pre-formed so that the cut portions lay at the ridges of the mold.

In "the case where strict pre-forming was not performed", the molding material was pre-formed without being cut. In this case, divergences of 1 mm to 5 mm from the position in "the case where pre-forming was strictly performed" occurred.

(Method for Evaluating Isotropy)

Figure 16B:
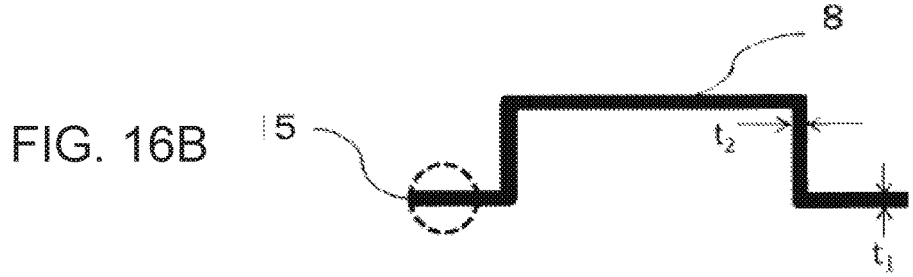
FIG. 16B is a schematic view of a shaped product obtained using the mold of FIG. 16A.
Figure 17B:
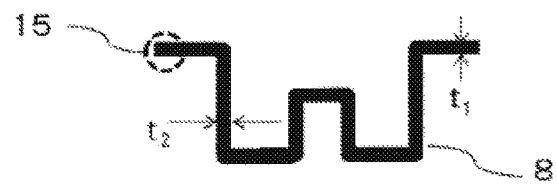
FIG. 17B is a schematic view of a shaped product obtained using the mold of FIG. 17A.
Figure 20A:
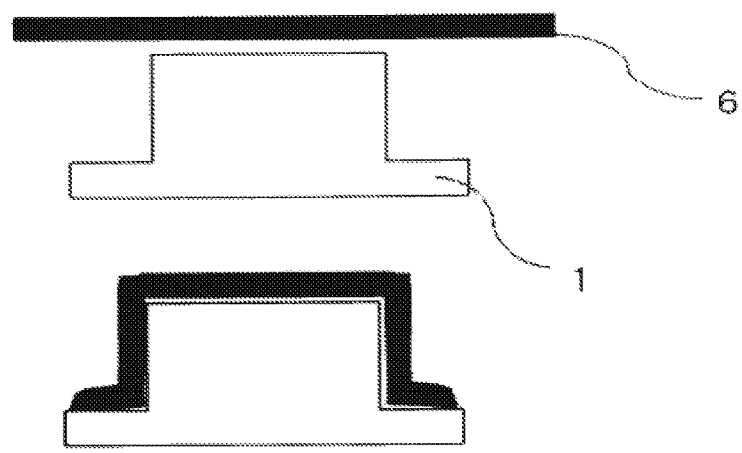
FIGS. 20A to 20D are schematic views illustrating one example of the case where a molding material is pre-formed and then cold-pressed.
Figure 20B:
Figure 20C:
Figure 20D:
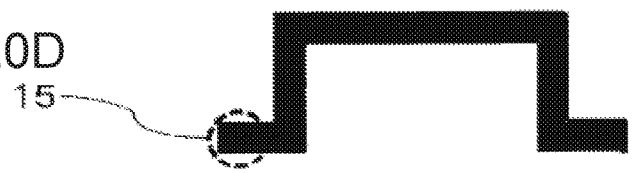
Figure 21A:
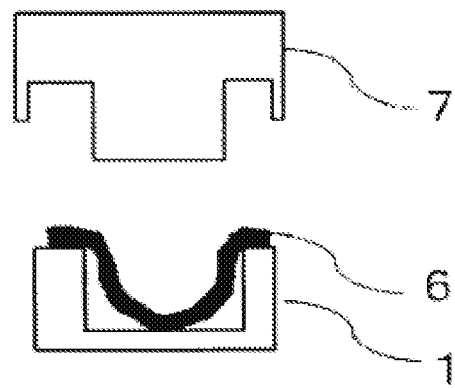
FIGS. 21A to 21D are schematic views illustrating another example of a case where a molding material is pre-formed and then cold-pressed.
Figure 21B:
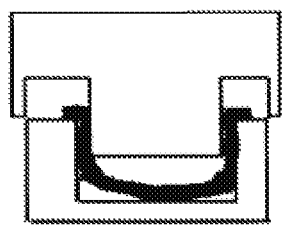
Figure 21C:
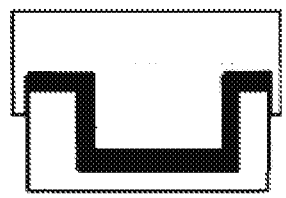
Figure 21D:
Figure 22A:
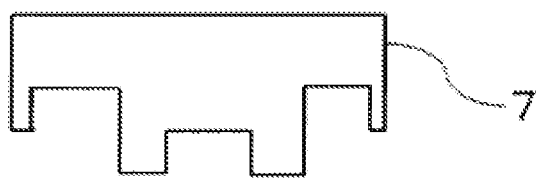
FIGS. 22A to 22D are schematic views illustrating still another example of a case where a molding material is pre-formed and then cold-pressed.
Figure 22B:
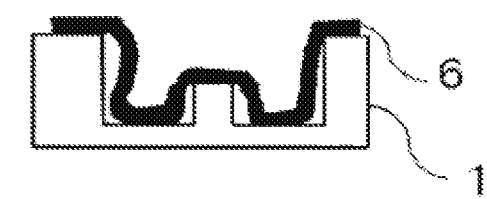
Figure 22C:
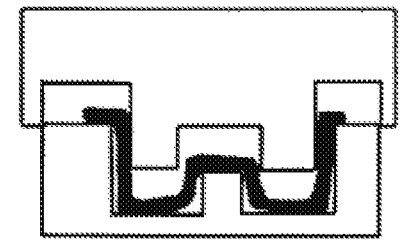
Figure 22D:
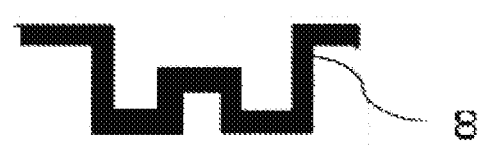

Dumbbell specimens were cut out respectively of end parts of the shaped products obtained (15 in FIG. 16B, 15 in FIG. 17B, and 15 in FIG. 18B). (The dumbbell specimens were each cut out so that the direction W in each of FIG. 16A, FIG. 17A, and FIG. 18A was the longitudinal direction of the specimen.)

Furthermore, dumbbell specimens were cut out respectively of the central parts of the shaped products (the central parts in the case of FIGS. 16A and 16B and 17A and 17B, and a pseudo-central part 17 in the case of FIG. 18B).

The dumbbell specimens obtained were each examined for tensile strength in accordance with JIS K7164:2005, and the tensile strength (i1) of the end part was divided by the tensile strength (i2) of the central part to evaluate the isotropy.

(Method for Evaluating Tensile Rupture Elongation $\epsilon v$)

The various molding materials which will be described later (molding material (i) or molding material (ii)) were cut into a size of 200 mm (length)×25 mm (width). Six such cut sheets were layered so as to result in a thickness of 3.0 mm, dried in a 120° C. hot-air drying oven for 4 hours, and then heated to 300° C. with an infrared heater.

Subsequently, the upper and lower molds shown in FIG. 19A were prepared, in which the depth (16 in FIG. 19A) was 200 mm, the distance between outlet edges of the opening was 50 mm, and the clearance between the upper and lower molds was 3.0 mm. The temperature thereof was set at 140° C., and the six cut sheets of each molding material which had been heated were arranged, in the stacked state, on the lower mold so as to bridge the opening. The molds were closed at a clamping speed of 20 mm/sec using ZEN Former MPS4200, manufactured by Hoden Seimitsu Kako Kenkyusho, Co., Ltd. Although the temperature at which the tensile rupture elongation $\epsilon v$ is to be measured varies depending on the thermoplastic resin used, the tensile rupture elongation $\epsilon v$ was measured at the temperature used for press molding.

The molds were closed until the molding material was ruptured. Thereafter, the molding material was taken out, and the length (y) of the stretched molding material was measured. In accordance with expression (f) shown above, the length (y) was divided by the length (x) of the unstretched molding material to calculate the tensile rupture elongation EV. Incidentally, the length (x) of the unstretched molding material was regulated to the dimension of the opening, i.e., 50 mm.

(Method for Evaluating Surface Appearance)

Each shaped product obtained by press molding was visually examined, and the appearance thereof was assessed on the basis of the following criteria.

A: The shaped product includes no unfilled portion and has an excellent surface appearance with no surface creases.

B: Marks formed by flows of the molding material are observed in the surface, although the shaped product is not problematic in practical use.

C: The shaped product has a poor appearance with unfilled portions and holes.

(Method for Evaluating Flexural Strength of Shaped-Product End Part)

A specimen having a length of 100 mm and a width of 10 mm was cut out of an end part (or a portion including an end part) (15 in FIG. 16B, 15 in FIG. 17B, or 15 in FIG. 18B) of each shaped product. Using bending tester 5966, manufactured by Instron Corp., the flexural strength was measured in accordance with JIS K7074:1988 by the three-point bending method in which the support-to-support distance was regulated so as to result in a p/t of 40 (p is support-to-support distance and t is plate thickness).

A: 400 MPa or higher

B: 380 MPa or higher but less than 400 MPa

C: 360 MPa or higher but less than 380 MPa

D: Less than 360 MPa (Method for Evaluating Burr Occurrence)

Each shaped product obtained was visually examined, and the occurrence of burrs was evaluated in accordance with the following criteria.

A: No burrs were observed at all.

B: Burrs occurred slightly, but the burrs need not be removed and are not problematic for use.

C: Burrs occurred, and removal of the burrs is necessary for use of the shaped product.

(Method for Evaluating Biting)

Biting is the phenomenon in which when upper and lower molds are clamped, the molding material is bitten between the molds in an inappropriate position (e.g., 18 in FIG. 5C). This phenomenon occurs when the molding material was unable to be arranged in a desired position.

A: No biting occurred at all.

B: Biting occurred in a maximum length of 2 mm or less.

C: Biting occurred in a maximum length exceeding 2 mm.

Production of Shaped Products of
Carbon-Fiber-Reinforced Resins

Production Example 1

As carbon fibers, use was made of carbon fibers "Tenax" (registered trademark) STS40-24KS (average fiber diameter, 7 μm), manufactured by Toho Tenax Co., Ltd., which had been cut to an average fiber length of 20 mm. As a resin was used nylon-6 resin A1030, manufactured by Unichika, Ltd. In accordance with the method described in WO 2012/105080 pamphlet, the carbon fibers and the nylon resin were used to produce a mat which had a carbon-fiber areal weight of 310 g/m$^2$ and a nylon-resin areal weight of 370 g/m$^2$ and in which the carbon fibers had been two-dimensionally randomly oriented.

The mat obtained was heated, at 2.0 MPa for 5 minutes, with a pressing device heated at 260° C. Thus, a molding material (i) having a thickness of 0.5 mm was obtained.

With respect to the molding material (i) obtained, the carbon fibers contained therein were analyzed. As a result, the following were found: the critical number of single fibers defined by expression (a) was 86; the average number of single fibers (N) in carbon fiber bundles (A) each made up of carbon fibers not less than the critical number of single fibers was 420; and the proportion of the carbon fiber bundles (A) each made up of carbon fibers not less than the critical number of single fibers was 85 vol % of all the carbon fibers. The molding material (i) had a volume content of carbon fibers of 35% (carbon fiber content by mass, 46%) and a tensile rupture elongation εv of 200%.

Production Example 2

A molding material was prepared to produce a molding material (ii) in the same manner as in Production Example 1, except that the degree of opening was regulated so that the critical number of single fibers defined by expression (a) was 86, the average number of single fibers (N) in carbon fiber bundles (A) each made up of carbon fibers not less than the critical number of single fibers was 100, and the proportion of the carbon fiber bundles (A) each made up of carbon fibers not less than the critical number of single fibers was 10 vol % of all the carbon fibers. The molding material (ii) had a tensile rupture elongation εv of 110%.

Example 1

Six sheets having a size of 200 mm×350 mm were cut out of the molding material (i) [(dimension $T_1$ shown in FIG. 16A)*(dimension $T_2$ shown in FIG. 16A]. The sheets were dried in a 120° C. hot-air drying oven for 4 hours and then heated to 300° C. with an infrared heater. The temperature of the molds was set at 140° C., and the six cut sheets of the molding material which had been heated were layered in a thickness of 3.0 mm and introduced into the molds in the manner shown by FIG. 16A. In this procedure, strict pre-forming was not performed.

Subsequently, the molding material (i) was pressed at a pressing pressure of 2 MPa for 1 minute to obtain a shaped product.

Example 2

A shaped product was obtained through molding in the same manner as in Example 1, except that seven sheets were cut out of the molding material (i) and layered so as to result in a thickness of 3.5 mm.

Example 3

A shaped product was obtained through molding in the same manner as in Example 1, except that five sheets were cut out of the molding material (i) and layered so as to result in a thickness of 2.5 mm.

Example 4

A shaped product was obtained through molding in the same manner as in Example 1, except that eight sheets were cut out of the molding material (i) and layered so as to result in a thickness of 4.0 mm.

Comparative Examples 3 to 6

Shaped products were obtained in the same manners as in Examples 1 to 4, except that pre-forming was performed strictly.

Example 5

A shaped product was obtained through molding in the same manner as in Example 1, except that the molding material was cut into a size of 200 mm×300 mm.

Example 6

A shaped product was obtained through molding in the same manner as in Example 3, except that the molding material was cut into a size of 200 mm×260 mm.

Examples 15 and 16

Shaped products were obtained in the same manners as in Examples 5 and 6, except that pre-forming was strictly performed from the standpoint of reducing product unevenness.

Example 7

A shaped product was obtained through molding in the same manner as in Example 3, except that the molding material (ii) was used.

Comparative Example 7

A shaped product was obtained in the same manner as in Example 7, except that pre-forming was performed strictly.

Example 8

A shaped product was obtained through molding in the same manner as in Example 7, except that the molding material was cut into a size of 200 mm×270 mm. The molding material did not flow sufficiently and, hence, the complete shape of a desired shaped product including the end parts thereof was unable to be obtained.

Example 17

A shaped product was obtained in the same manner as in Example 8, except that pre-forming was performed strictly.

Example 9

Six sheets having a size of 200 mm×550 mm were cut out of the molding material (i) [(dimension $T_1$ shown in FIG. 17A)*(dimension $T_2$ shown in FIG. 17A]. The sheets were dried in a 120° C. hot-air drying oven for 4 hours and then heated to 300° C. with an infrared heater. The temperature of the molds was set at 140° C., and the six cut sheets of the molding material which had been heated were layered in a thickness of 3.0 mm and introduced into the molds in the manner shown by FIG. 17A. Subsequently, the molding material (i) was pressed at a pressing pressure of 2 MPa for 1 minute to obtain a shaped product. In FIG. 17A, $I_3$ is 40 mm.

Comparative Example 8

A shaped product was obtained in the same manner as in Example 9, except that pre-forming was performed strictly.

Example 10

A shaped product was obtained through molding in the same manner as in Example 9, except that the molding material (i) was cut into a size of 200 mm×400 mm and the thickness of the molding material was regulated to 3.5 mm.

Example 11

A shaped product was obtained through molding in the same manner as in Example 10, except that the molding material (ii) was used. The molding material did not flow sufficiently and, hence, the complete shape of a desired shaped product including the end parts thereof was unable to be obtained.

Example 12

Six sheets having a size of 180 mm×180 mm were cut out of the molding material (i) [(dimension $T_1$ shown in FIG. 18A)*(dimension $T_2$ shown in FIG. 18A]. The sheets were dried in a 120° C. hot-air drying oven for 4 hours and then heated to 300° C. with an infrared heater. The temperature of the molds was set at 140° C., and the six cut sheets of the molding material which had been heated were layered in a thickness of 3.0 mm and introduced into the molds in the manner shown by FIG. 18A. Subsequently, the molding material (i) was pressed at a pressing pressure of 2 MPa for 1 minute to obtain a shaped product.

Example 13

A shaped product was obtained through molding in the same manner as in Example 1, except that the molding material was cut into a size of 195 mm×340 mm.

Example 14

A shaped product was obtained through molding in the same manner as in Example 1, except that the molding material was cut into a size of 195 mm×300 mm.

Examples 18 to 22

Shaped products were obtained in the same manners as in Examples 11 to 14, except that pre-forming was performed strictly.

Comparative Example 1

Ten sheets having a size of 200 mm×200 mm were cut out of the molding material (i) [(dimension $T_1$ shown in FIG. 16A)*(dimension $T_2$ shown in FIG. 16A]. The sheets were dried in a 120° C. hot-air drying oven for 4 hours and then heated to 300° C. with an infrared heater. The temperature of the molds was set at 140° C., and the ten cut sheets of the molding material which had been heated were layered in a thickness of 5 mm and introduced into the molds. Subsequently, the molding material (i) was pressed at a pressing pressure of 2 MPa for 1 minute to obtain a shaped product. The projected area of the molding material to be arranged in the molds was not larger than the projected area of the mold cavity (the charge ratio (%) based on the projected area of the mold cavity was 100% or less). Because of this, the end parts were formed by causing the molding material to flow during the molding, resulting in a poor flexural strength.

Comparative Example 2

A shaped product was obtained through molding in the same manner as in Example 1, except that an upper mold for a mold having the shape shown in FIG. 16A was regulated so that not a closed cavity but an open cavity was formed. The molding material flowed out of the mold cavity, resulting in a large amount of burrs. Evaluation of flexural strength and isotropy was hence omitted. Furthermore, since an open cavity was used, the evaluation of biting was omitted.

[Flexural Strength of Top Surface Part]

A top surface part was cut out of each of the shaped products of the Examples and Comparative Examples, and the flexural strength of each top surface part was measured in the same manner as for end parts. As a result, all the top surface parts were rated as A. This means that in cases when the end part of each of the shaped products of the Examples and Comparative Examples has a satisfactory flexural strength, the shaped-product end part has stable mechanical properties.

The shaped products of the Examples and Comparative Examples, the molding materials and various conditions therefor, and the results of evaluation thereof are shown in Tables 1 to 5 below.

TABLE 1

|  |  | Example 1 | Example 2 | Example 3 | Example 4 | Example 5 | Example 6 |
|---|---|---|---|---|---|---|---|
| Mold | Shape of mold | FIG. 16 | FIG. 16 | FIG. 16 | FIG. 16 | FIG. 16 | FIG. 16 |
|  | L (mm) | 150 | 150 | 150 | 150 | 150 | 150 |
|  | $l_1$ (mm) | 50 | 50 | 50 | 50 | 50 | 50 |
|  | $l_2$ (mm) | 50 | 50 | 50 | 50 | 50 | 50 |
|  | $m_1$ (mm) | 50 | 50 | 50 | 50 | 50 | 50 |
|  | $m_2$ (mm) | — | — | — | — | — | — |
|  | Creeping dimension D (mm) | 350 | 350 | 350 | 350 | 350 | 350 |
|  | W (mm) | 200 | 200 | 200 | 200 | 200 | 200 |
|  | Projected area of die cavity S2 (mm²) | 50,000 | 50,000 | 50,000 | 50,000 | 50,000 | 50,000 |
|  | Overall area of die cavity S3 (mm²) | 70,000 | 70,000 | 70,000 | 70,000 | 70,000 | 70,000 |
|  | Desired capacity of closable cavity (V1) (mm³) | 210,000 | 210,000 | 210,000 | 210,000 | 210,000 | 210,000 |
| Molding material | Kind | molding material (i) | molding material (i) | molding material (i) | molding material (i) | molding material (i) | molding material (i) |
|  | Average fiber length (mm) | 20 | 20 | 20 | 20 | 20 | 20 |
|  | $T_1$ dimension (mm) | 200 | 200 | 200 | 200 | 200 | 200 |
|  | $T_2$ dimension (mm) | 350 | 350 | 350 | 350 | 300 | 260 |
|  | Projected area of molding material S1 (mm²) | 70,000 | 70,000 | 70,000 | 70,000 | 60,000 | 52,000 |

TABLE 1-continued

|  |  | Example 1 | Example 2 | Example 3 | Example 4 | Example 5 | Example 6 |
|---|---|---|---|---|---|---|---|
| Various conditions | Thickness of molding material (mm) | 3.0 | 3.5 | 2.5 | 4.0 | 3.0 | 2.5 |
|  | Volume of molding material V2 (mm$^3$) | 210,000 | 245,000 | 175,000 | 280,000 | 180,000 | 130,000 |
|  | Tensile elongation at rupture εv (%) | 200% | 200% | 200% | 200% | 200% | 200% |
|  | Charge ratio based on projected area of die cavity S1/S2 × 100 (%) | 140% | 140% | 140% | 140% | 120% | 104% |
|  | Charge ratio based on overall area of die cavity S1/S3 × 100 (%) | 100% | 100% | 100% | 100% | 86% | 74% |
|  | D-L × εv (mm) | 50 | 50 | 50 | 50 | 50 | 50 |
|  | S1 × εv/S3 | 2.0 | 2.0 | 2.0 | 2.0 | 1.7 | 1.5 |
|  | (Capacity of closable cavity V1)/(volume of molding material V2) (V1/V2) | 1.0 | 0.9 | 1.2 | 0.8 | 1.2 | 1.6 |
| Evaluation of formability | Flow distance in the case where molding material was arranged slightly loosely (mm) | 2 | 2 | 2 | 2 | 25 | 45 |
|  | Biting of molding material in the case where the molding material was arranged slightly loosely | B | C | B | C | A | A |
| Evaluation of shaped product | Thickness of top surface part and flange part, t1 (mm) | 3.0 | 3.7 | 2.3 | 4.4 | 2.4 | 1.4 |
|  | Thickness of wall surface part, t2 (mm) | 3.0 | 3.0 | 3.0 | 3.0 | 3.0 | 3.0 |
|  | Flexural strength of end part | A | A | A | A | B | C |
|  | Surface appearance | A | A | B | B | B | C |
|  | Relationship between end-part isotropy i1 and central-part isotropy i2 i1/i2 | 1.00 | 1.00 | 1.00 | 1.00 | 1.25 | 1.50 |

TABLE 2

|  |  | Example 7 | Example 8 | Example 9 | Example 10 | Example 11 | Example 12 |
|---|---|---|---|---|---|---|---|
| Mold | Shape of mold | FIG. 16 | FIG. 16 | FIG. 17 | FIG. 17 | FIG. 17 | FIG. 18 |
|  | L (mm) | 150 | 150 | 150 | 150 | 150 | 50 |
|  | l$_1$ (mm) | 50 | 50 | 50 | 50 | 50 | — |
|  | l$_2$ (mm) | 50 | 50 | 50 | 50 | 50 | — |
|  | m$_1$ (mm) | 50 | 50 | 100 | 100 | 100 | 20 |
|  | m$_2$ (mm) | — | — | 50 | 50 | 50 | — |
|  | Creeping dimension D (mm) | 350 | 350 | 450 | 450 | 450 | 90 |
|  | W (mm) | 200 | 200 | 200 | 200 | 200 | 150 |
|  | Projected area of die cavity S2 (mm$^2$) | 50,000 | 50,000 | 50,000 | 50,000 | 50,000 | 22,500 |
|  | Overall area of die cavity S3 (mm$^2$) | 70,000 | 70,000 | 110,000 | 110,000 | 110,000 | 25,642 |
|  | Desired capacity of closable cavity (V1) (mm$^3$) | 210,000 | 210,000 | 330,000 | 330,000 | 330,000 | 76,925 |
| Molding material | Kind | molding material (ii) | molding material (ii) | molding material (i) | molding material (i) | molding material (ii) | molding material (ii) |
|  | Average fiber length (mm) | 20 | 20 | 20 | 20 | 20 | 20 |
|  | T$_1$ dimension (mm) | 200 | 200 | 200 | 200 | 200 | 180 |
|  | T$_2$ dimension (mm) | 350 | 270 | 550 | 400 | 400 | 180 |
|  | Projected area of molding material S1 (mm$^2$) | 70,000 | 54,000 | 110,000 | 80,000 | 80,000 | 32,400 |
|  | Thickness of molding material (mm) | 2.5 | 2.5 | 3.0 | 3.5 | 3.5 | 3.0 |

TABLE 2-continued

|  |  | Example 7 | Example 8 | Example 9 | Example 10 | Example 11 | Example 12 |
|---|---|---|---|---|---|---|---|
| Various conditions | Volume of molding material V2 (mm³) | 175,000 | 135,000 | 330,000 | 280,000 | 280,000 | 97,200 |
|  | Tensile elongation at rupture εv (%) | 110% | 110% | 200% | 200% | 110% | 200% |
|  | Charge ratio based on projected area of die cavity S1/S2 × 100 (%) | 140% | 108% | 220% | 160% | 160% | 144% |
|  | Charge ratio based on overall area of die cavity S1/S3 × 100 (%) | 100% | 77% | 100% | 73% | 73% | 126% |
|  | D-L × εv (mm) | 185 | 185 | 150 | 150 | 285 | −10 |
|  | S1 × εv/S3 | 1.1 | 0.8 | 2.0 | 1.5 | 0.8 | — |
|  | (Capacity of closable cavity V1)/(volume of molding material V2) (V1/V2) | 1.2 | 1.6 | 1.0 | 1.2 | 1.2 | 0.8 |
| Evaluation of formability | Flow distance in the case where molding material was arranged slightly loosely (mm) | 2 | 35 | 2 | 75 | 35 | 10 |
|  | Biting of molding material in the case where the molding material was arranged slightly loosely | B | A | B | A | A | A |
| Evaluation of shaped product | Thickness of top surface part and flange part, t1 (mm) | 2.3 | 1.5 | 3.0 | 2.0 | 2.0 | 3.9 |
|  | Thickness of side surface part, t2 (mm) | 3.0 | 3.0 | 3.0 | 3.0 | 3.0 | 3.0 |
|  | Flexural strength of end part | A | C | A | B | C | B |
|  | Surface appearance | A | C | A | B | C | B |
|  | Relationship between end-part isotropy i1 and central-part isotropy i2 i1/i2 | 1.00 | 1.40 | 1.00 | 1.80 | 1.80 | 1.05 |

TABLE 3

|  |  | Comparative Example 1 | Comparative Example 2 | Example 13 | Example 14 |
|---|---|---|---|---|---|
| Mold | Shape of Mold | FIG. 16 | FIG. 16 (open type cavity) | FIG. 16 | FIG. 16 |
|  | L (mm) | 150 | 150 | 150 | 150 |
|  | l₁ (mm) | 50 | 50 | 50 | 50 |
|  | l₂ (mm) | 50 | 50 | 50 | 50 |
|  | m₁ (mm) | 50 | 50 | 50 | 50 |
|  | m₂ (mm) | — | — | — | — |
|  | Creeping dimension D (mm) | 350 | 350 | 350 | 350 |
|  | W (mm) | 200 | 200 | 200 | 200 |
|  | Projected area of die cavity S2 (mm²) | 50,000 | 50,000 | 50,000 | 50,000 |
|  | Overall area of die cavity S3 (mm²) | 70,000 | 70,000 | 70,000 | 70,000 |
|  | Desired capacity of closable cavity (V1) (mm³) | 210,000 | 210,000 | 210,000 | 210,000 |
| Molding material | Kind | molding material (i) | molding material (i) | molding material (i) | molding material (i) |
|  | Average fiber length (mm) | 20 | 20 | 20 | 20 |
|  | T₁ dimension (mm) | 200 | 200 | 195 | 195 |
|  | T₂ dimension (mm) | 200 | 350 | 340 | 300 |
|  | Projected area of molding material S1 (mm²) | 40,000 | 70,000 | 66,300 | 58,500 |
|  | Thickness of molding material (mm) | 5.0 | 3.0 | 3.0 | 3.0 |

TABLE 3-continued

|  |  | Comparative Example 1 | Comparative Example 2 | Example 13 | Example 14 |
| --- | --- | --- | --- | --- | --- |
| Various conditions | Volume of molding material V2 (mm³) | 200,000 | 210,000 | 198,900 | 175,500 |
|  | Tensile elongation at rupture εv (%) | 200% | 200% | 200% | 200% |
|  | Charge ratio based on projected area of die cavity S1/S2 × 100 (%) | 80% | 140% | 133% | 117% |
|  | Charge ratio based on overall area of die cavity S1/S3 × 100 (%) | 57% | 100% | 95% | 84% |
|  | D-L × εv (mm) | 50 | 50 | 50 | 50 |
|  | S1 × εv/S3 | 1.1 | 2.0 | 1.9 | 1.7 |
|  | (Capacity of closable cavity V1)/(volume of molding material V2) (V1/V2) | 1.1 | 1.0 | 1.1 | 1.2 |
| Evaluation of formability | Flow distance in the case where molding material was arranged slightly loosely (mm) | 75 | 60 | 5 | 25 |
|  | Biting of molding material in the case where the molding material was arranged slightly loosely | A | — | A | A |
| Evaluation of shaped product | Thickness of top surface part and flange part, t1 (mm) | 2.8 | 2.5 | 2.8 | 2.3 |
|  | Thickness of side surface part, t2 (mm) | 3.0 | 3.0 | 3.0 | 3.0 |
|  | Flexural strength of end part | D | — | A | A |
|  | Surface appearance | B | C | A | A |
|  | Relationship between end-part isotropy i1 and central-part isotropy i2 i1/i2 | 1.80 | — | 1.10 | 1.25 |

* With respect to Comparative Example 2, evaluation of flexural strength and isotropy was omitted because the molding material had flowed out of the cavity.

TABLE 4

|  |  | Comp. Ex. 3 | Comp. Ex. 4 | Comp. Ex. 5 | Comp. Ex. 6 | Ex. 15 | Ex. 16 | Comp. Ex. 7 |
| --- | --- | --- | --- | --- | --- | --- | --- | --- |
| Evaluation of formability | Flow distance in the case where the molding material was strictly pre-formed and arranged (mm) | 0 | 0 | 0 | 0 | 25 | 45 | 0 |
|  | Evaluation of burr occurrence in the case where the molding material was strictly pre-formed and arranged | A | B | A | B | A | A | A |

TABLE 5

|  |  | Ex. 17 | Comp. Ex. 8 | Ex. 18 | Ex. 19 | Ex. 20 | Ex. 21 | Ex. 22 |
| --- | --- | --- | --- | --- | --- | --- | --- | --- |
| Evaluation of formability | Flow distance in the case where the forming material was strictly pre-formed and arranged (mm) | 35 | 0 | 75 | 35 | 10 | 5 | 25 |
|  | Evaluation of burr occurrence | A | A | A | A | A | A | A |

TABLE 5-continued

| | Comp. Ex. 8 | Ex. 17 | Ex. 18 | Ex. 19 | Ex. 20 | Ex. 21 | Ex. 22 |
|---|---|---|---|---|---|---|---|
| in the case where the forming material was strictly pre-formed and arranged | | | | | | | |

INDUSTRIAL APPLICABILITY

Shaped products obtained by the production method of the invention can be used as various constituent members, e.g., interior or exterior boards and constituent members for motor vehicles, and as the frames or housings of various electrical products or machines, or the like.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 20, 2014 (Application No. 2014-127295), the contents thereof being incorporated herein by reference.

DESCRIPTION OF THE REFERENCE NUMERALS AND SIGNS

1. Mold (lower mold)
2. Projected area of mold cavity
3. Overall area S3 of mold cavity
4. Overall area S3 of mold cavity
5. Projected area of molding material
6. Molding material
6'. Molding material having projected area not larger than the projected area of mold cavity
7. Mold (upper mold)
8. Shaped product
8'. Conventional shaped product
8'-1. End part of conventional shaped product
9. Layered portion of molding material during molding
10. Layered portion of molding material during molding
11. Wall surface part
12. Top surface part
13. Flange part
14. Opening
15. End part of shaped product
16. Depth of mold
17. Pseudo-central part
L. Projected distance between outlet edges of opening of shaped product
D. Creeping dimension D of projected distance L between outlet edges of opening of shaped product
E. Distance E between top surface part and opening of shaped product
x. Length of molding material before stretching
y. Length of stretched molding material

The invention claimed is:

1. A method for producing a shaped product having an opening by arranging a molding material comprising discontinuous carbon fibers and a thermoplastic resin on a mold and cold-pressing the molding material, wherein (1) the mold has a portion serving as a closable cavity and (2) the molding material to be arranged on the mold has a projected area larger than the projected area of the mold cavity, and in the cold pressing, the molding material flows to form an end part of the shaped product, the distance over which the molding material flows being longer than 0 mm and not longer than 150 mm, and wherein the opening is formed by at least one of stretching and flowing of the molding material during molding, (3) in the case where $D-L*\epsilon v>0$ holds, wherein $\epsilon v$ is a tensile rupture elongation of the molding material, L is a distance between outlet edges of the opening in a cross-section of the shaped product, and D is a creeping dimension of the opening in the cross-section, then (4) the molding material to be arranged has a length which includes both the distance L between outlet edges of the opening in the cross-section of the shaped product and a portion not smaller than $D-L*\epsilon v$, and (5) the tensile rupture elongation $\epsilon v$ of the molding material is higher than 110% and not higher than 300%.

2. The method for producing a shaped product according to claim 1, wherein the flow occurs in in-plane directions of the molding material.

3. The method for producing a shaped product according to claim 1, wherein the projected area of the molding material to be arranged on the mold is up to 3 times the overall area of the mold cavity.

4. The method for producing a shaped product according to claim 1, wherein the distance over which the molding material flows is longer than 1 mm but not longer than 100 mm.

5. The method for producing a shaped product according to claim 1, wherein the molding material which is arranged on the mold is pre-formed before being cold-pressed.

6. The method for producing a shaped product according to claim 1, wherein the discontinuous carbon fibers have an average fiber length of 1 mm to 100 mm.

7. The method for producing a shaped product according to claim 6, wherein the discontinuous carbon fibers in the molding material are two-dimensionally randomly oriented.

8. The method for producing a shaped product according to claim 1, wherein a capacity V1 of the closable cavity and a volume V2 of the molding material satisfy $0.8 \leq V1/V2 \leq 1.2$.

* * * * *